(12) United States Patent
Segota et al.

(10) Patent No.: US 7,475,853 B2
(45) Date of Patent: Jan. 13, 2009

(54) METHOD AND SYSTEM FOR REGULATING EXTERNAL FLUID FLOW OVER AN OBJECT'S SURFACE, AND PARTICULARLY A WING AND DIFFUSER

(75) Inventors: Darko Segota, 7432 S. Magic View Cir., Salt Lake City, UT (US) 84121; John W. Finnegan, II, Oakley, UT (US)

(73) Assignee: Darko Segota, Salt Lake City, UT (US)

( * ) Notice: Subject to any disclaimer, the term of this patent is extended or adjusted under 35 U.S.C. 154(b) by 0 days.

(21) Appl. No.: 10/600,207

(22) Filed: Jun. 19, 2003

(65) Prior Publication Data
US 2004/0104309 A1    Jun. 3, 2004

Related U.S. Application Data

(60) Provisional application No. 60/390,510, filed on Jun. 21, 2002.

(51) Int. Cl.
*B64C 1/38* (2006.01)
(52) U.S. Cl. .................. 244/198; 244/204; 244/130; 114/291; 114/67 R
(58) Field of Classification Search ............. 244/130, 244/198–204; 114/291, 67 R
See application file for complete search history.

(56) References Cited

U.S. PATENT DOCUMENTS 2,575,185 A * 11/1951 Mulholland ............... 244/35 R (Continued)

OTHER PUBLICATIONS

Henri Marie Coanda; http://www.allstar.fiu.edu/aero/coanda.htm; 5 pgs; May 22, 2003.

(Continued)

*Primary Examiner*—John W Eldred
(74) *Attorney, Agent, or Firm*—Michael F. Krieger; Kirton & McConkie

(57) ABSTRACT

The present invention features a fluid flow regulator that functions to significantly influence fluid flow across the surface of an object, as well as to significantly effect the performance of the object subjected to the fluid. The fluid flow regulator comprises a pressure recovery drop that induces a sudden drop in pressure at an optimal pressure recovery point on said surface, such that a sub-atmospheric barrier is created that serves as a cushion between the molecules in the fluid and the molecules at the object's surface. More specifically, the present invention fluid flow regulator functions to significantly regulate the pressure gradients that exist along the surface of an object subject to fluid flow. Regulation of pressure gradients is accomplished by selectively reducing the pressure drag at various locations along the surface, as well as the pressure drag induced forward and aft of the object, via the pressure recovery drop. Reducing the pressure drag in turn increases pressure recovery or pressure recovery potential, which pressure recovery subsequently lowers the friction drag along the surface. By reducing or lowering friction drag, the potential for fluid separation is decreased, or in other words, attachment potential of the fluid is significantly increased. All of these effects may be appropriately and collectively phrased and referred to as optimization of fluid flow, wherein the fluid flow, its properties and characteristics (e.g., separation, boundary layer), and relationship to the object are each optimized. The present invention is specifically applicable to wings, wing-like structures (e.g. stabilizers and rudders), and diffusers.

53 Claims, 16 Drawing Sheets

U.S. PATENT DOCUMENTS

| | | | | |
|---|---|---|---|---|
| 3,056,277 | A | | 10/1962 | Brenner ........................ 73/23 |
| 4,171,785 | A | | 10/1979 | Isenberg ..................... 244/123 |
| 4,228,943 | A | | 10/1980 | Tanabe et al. ............... 228/182 |
| 4,449,211 | A | | 5/1984 | Schmidt et al. ............. 367/153 |
| 4,619,423 | A | | 10/1986 | Holmes et al. .............. 244/130 |
| 4,668,443 | A | | 5/1987 | Rye ........................... 261/112 |
| 4,699,340 | A | | 10/1987 | Rethorst ..................... 244/199 |
| 4,750,693 | A | * | 6/1988 | Lobert et al. ................ 244/200 |
| 4,813,631 | A | | 3/1989 | Gratzer ........................ 244/35 |
| 4,851,071 | A | | 7/1989 | Gallimore ................... 156/344 |
| 4,872,484 | A | | 10/1989 | Hickey ................... 137/561 R |
| 4,974,633 | A | | 12/1990 | Hickey ................... 137/561 R |
| 5,133,519 | A | * | 7/1992 | Falco ......................... 244/200 |
| 5,144,099 | A | | 9/1992 | Cardy ......................... 174/66 |
| 5,316,032 | A | | 5/1994 | DeCoux ....................... 137/14 |
| 5,335,885 | A | * | 8/1994 | Bohning ..................... 244/204 |
| 5,505,409 | A | * | 4/1996 | Wells et al. ................. 244/130 |
| 5,540,406 | A | * | 7/1996 | Occhipinti .................. 244/200 |
| 5,590,854 | A | | 1/1997 | Shatz ......................... 244/206 |
| 5,718,539 | A | | 2/1998 | Segota ........................ 406/61 |
| 5,810,249 | A | | 9/1998 | Nilsson ...................... 239/2.2 |
| 5,819,677 | A | * | 10/1998 | Livingston .................. 114/271 |
| 5,848,769 | A | * | 12/1998 | Fronek et al. ............... 244/200 |
| 5,863,155 | A | | 1/1999 | Segota ........................ 406/61 |
| 6,024,119 | A | * | 2/2000 | Kirschner ................ 137/487.5 |
| 6,180,536 | B1 | | 1/2001 | Chong et al. ................ 438/745 |
| 6,202,304 | B1 | | 3/2001 | Shatz ....................... 29/896.6 |
| 6,263,745 | B1 | | 7/2001 | Buchanan et al. .......... 73/865.5 |
| 6,345,791 | B1 | * | 2/2002 | McClure ..................... 244/200 |
| 6,357,307 | B2 | | 3/2002 | Buchanan et al. .......... 73/865.5 |
| 6,484,971 | B2 | * | 11/2002 | Layukallo ................... 244/130 |
| 7,070,850 | B2 | * | 7/2006 | Dietz et al. ................. 428/172 |
| 2001/0004835 | A1 | | 6/2001 | Alkabie et al. ................ 60/757 |
| 2001/0053817 | A1 | | 12/2001 | Anayama et al. ............ 525/107 |
| 2002/0092457 | A1 | * | 7/2002 | Radrizzani .................. 114/291 |

OTHER PUBLICATIONS

History of The "Coanda Effect"; http://www.geocities.com/ResearchTriangle/Lab/1135/coanda.htm; 13 pgs; May 22, 2003.
Lift, Thrust, Weight, and Drag; http://www.av8n.com/how/htm/4forces.html; 9 pgs; Jun. 4, 2003.
M.E. Research Page; file://E:\STUDY\fish%20separation.htm; 4 pgs; Jun. 6, 2003.
MicroCluster Water; http://www.aquatechnology.net/Microcluster_water.html; 7 pgs; May 22, 2003.
Misinterpretations of Bernoulli's Law; http://www.rz.uni-frankfurt.de/~weltner/Mis6/mis6.html; 11 pgs; Sep. 12, 2003.
A Physical Description of Flight; http://www.aa.washington.edu/faculty/eberhardt/lift.htm; 15 pgs; Sep. 12, 2003.
Post-processing of wake survey data from wind tunnel tests; http://www.nlr.nl/public/facilities/f217-01/; 5 pgs; Jun. 4, 2003.
Pressure; file://E:\STUDY\Pressure7.htm; 3 pgs; Jun. 6, 2003.
Pressure Patterns on the Airfoil; http://www.dynamicflight.com/aerodynamics/pres_patterns/; 2 pgs; Sep. 12, 2003.
The Schauberger's Flying Saucer; http://jnaudin.free.fr/html/repulsin.htm; 7 pgs; May 22, 2003.
Separation on a Free Surface; http://www.maths.cam.ac.uk/CASM/essays/abstracts/node84.html; 2 pgs; Sep. 12, 2003.
Similarity Parameters; http://www.lerc.nasa.gov/WWW/K-12/airplane/airsim.html; 3 pgs; Sep. 12, 2003.
Using the Coanda Effect; http://www.aardvark.co.nz/pjet/coanda.shtml; 3 pgs; May 22, 2003.
Virtual Experiments on Drag Reduction; Vladimir Kudriavtsev and M. Jack Braun; 48th Annual Conference of Canadian Aeronautics and Space Institute (CASI), 8th Aerodynamics Section Symposium, Toronto, Canada; 6 pgs; Apr. 29-May 2, 2001.
Bubble Plumes and the Coanda; http://66.218.71.225/search/cache?p=coanda+experiments&ei=UTF-8&xargs=0&b=21&url=...; 6 pgs; May 22, 2003.
Chapter 6: Aerodynamics; http://www.scitoys.com/scitoys/scitoys/aero/aero.html; 10 pgs; May 22, 2003.
Coanda Effect: Understanding Why Wings Work; http://www.jefraskin.com/forjef2/jefweb-compiled/published/coanda_effect.html; 21 pgs; May 22, 2003.
The Coanda Effect; http://jnaudin.free.fr/html/coanda.htm; 3 pgs; May 22, 2003.
The Coanda Saucer or the "Repulsin type A" test; http://jnaudin.free.fr/html/repcotst.htm; 6 pgs; May 22, 2003.
The Continuity Equation, the Reynolds Number, the Froude Number; file://E:\STUDY\88_06_04&20The%20Continuity%20Equation,%20the%20Reynolds%20Nu...; 10 pgs; Jun. 6, 2003.
Deltawing; http://www.aero.hut.fi/Englanniksi; 1 pg.
Drag of Blunt Bodies and Streamlined Bodies; http://www.princeton.edu/~asmits/Bicycle_web/blunt.html; 4 pgs; Sep. 12, 2003.
The effects of quadratic drag on the inverse cascade of two-dimensional turbulence; N. Grianik, I. Held, K.S. Smith, and G.K. Vallis; 16 pgs; Jul. 2002.
Henri Coanda; http://www.deltawing.go.ro/history/coanda.htm; 3 pgs; May 22, 2003.
Henri Coanda Romanian Scientist (1886-1972); http://romania-on-line.net/halloffame/CoandaHenri.htm; 3 pgs; May 22, 2003.
Aerodynamic DRAG; file://E:\STUDY\Aerodynamic%20Drag%20at%20High%20Speeds.htm; 9 pgs; Jun. 6, 2003.
Aerodynamics of Wind Turbines: Drag; http://www.windpower.org/en/tour/wtrb/drag.htm; 4 pgs; Sep. 12, 2003.
Airfoils and Lift; http://www.aviation-history.com/theory/airfoil.htm; 2 pgs; Sep. 12, 2003.
Bernoulli Equation; file://E:\STUDY\Pressure.htm; 6 pgs; Jun. 6, 2003.
Boundary layer and turbulence modeling: a persona; perspective; R.A. Brown; 10 pgs; Mar. 20, 1995.
Boundary Layer Control; http://www.aerodyn.org/Drag/blc.html; 4 pgs; Sep. 12, 2003.
Boundary-Layer Separation; http://www.ma.man.ac.uk/~ruban/blsep.html; 4 pgs; Sep. 12, 2003.
Boundary layer and turbulence modeling: a persona; perspective; http://www.atmos.washington.edu/~rabrown/amspblt6.html; 8 pgs; Jun. 4, 2003.

* cited by examiner

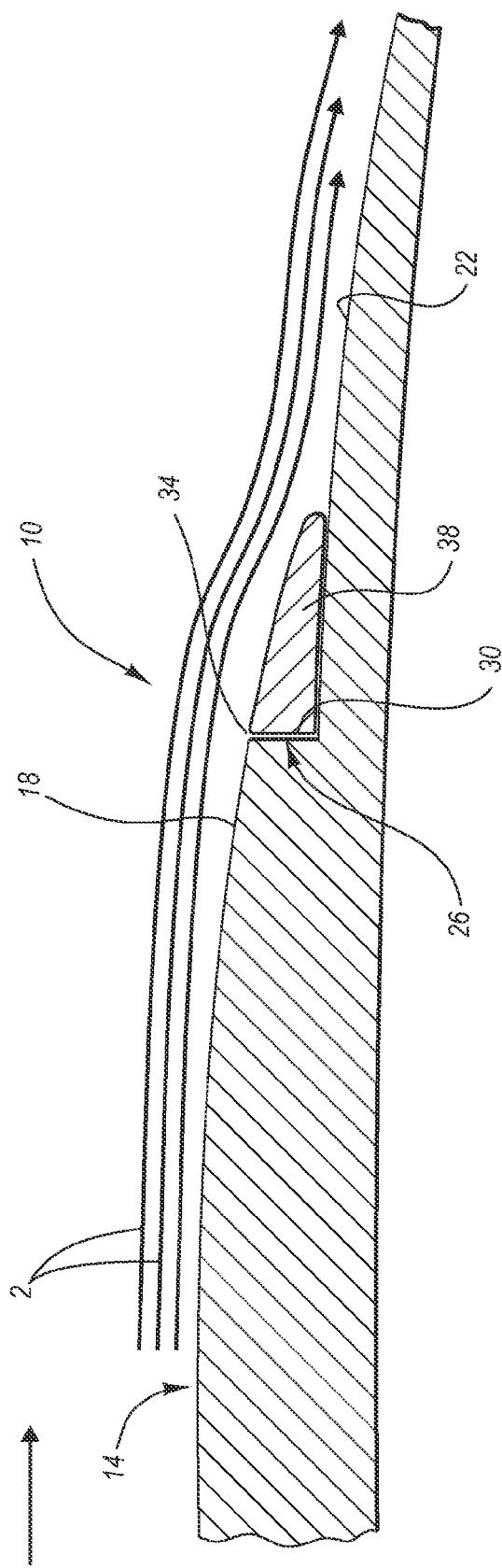
Fig. 2-A

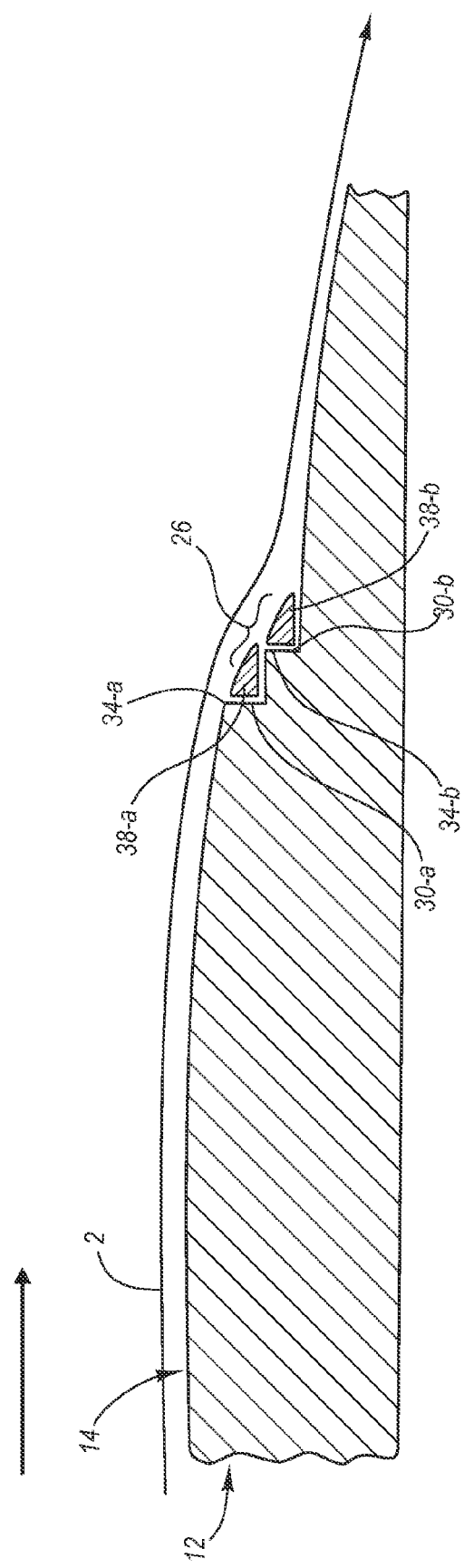
Fig. 2-B

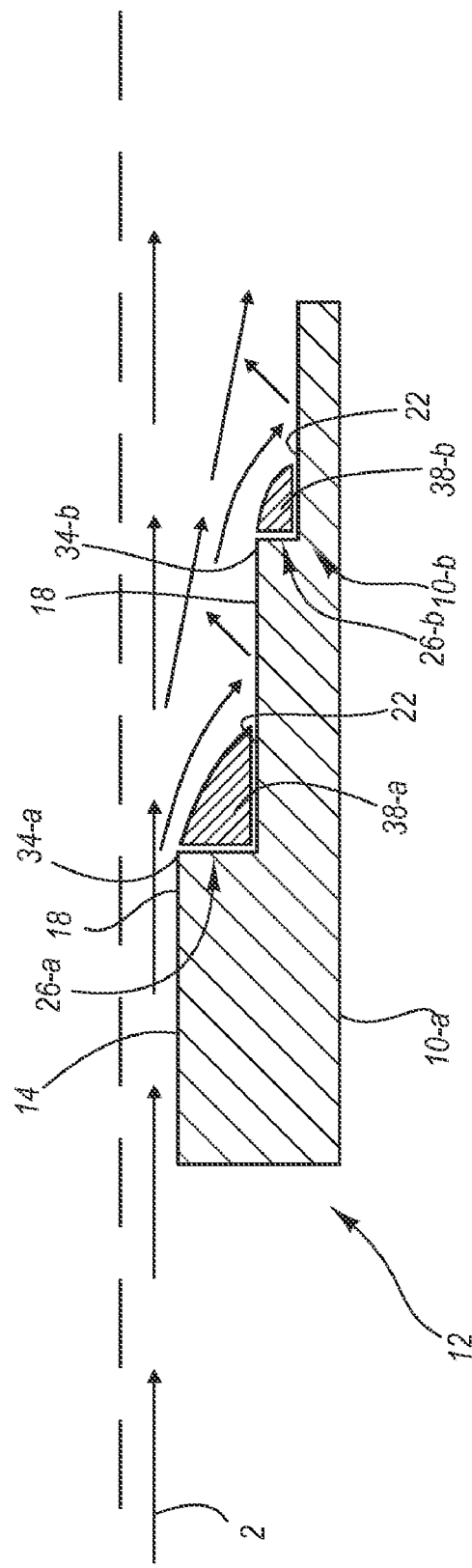
Fig. 2-C

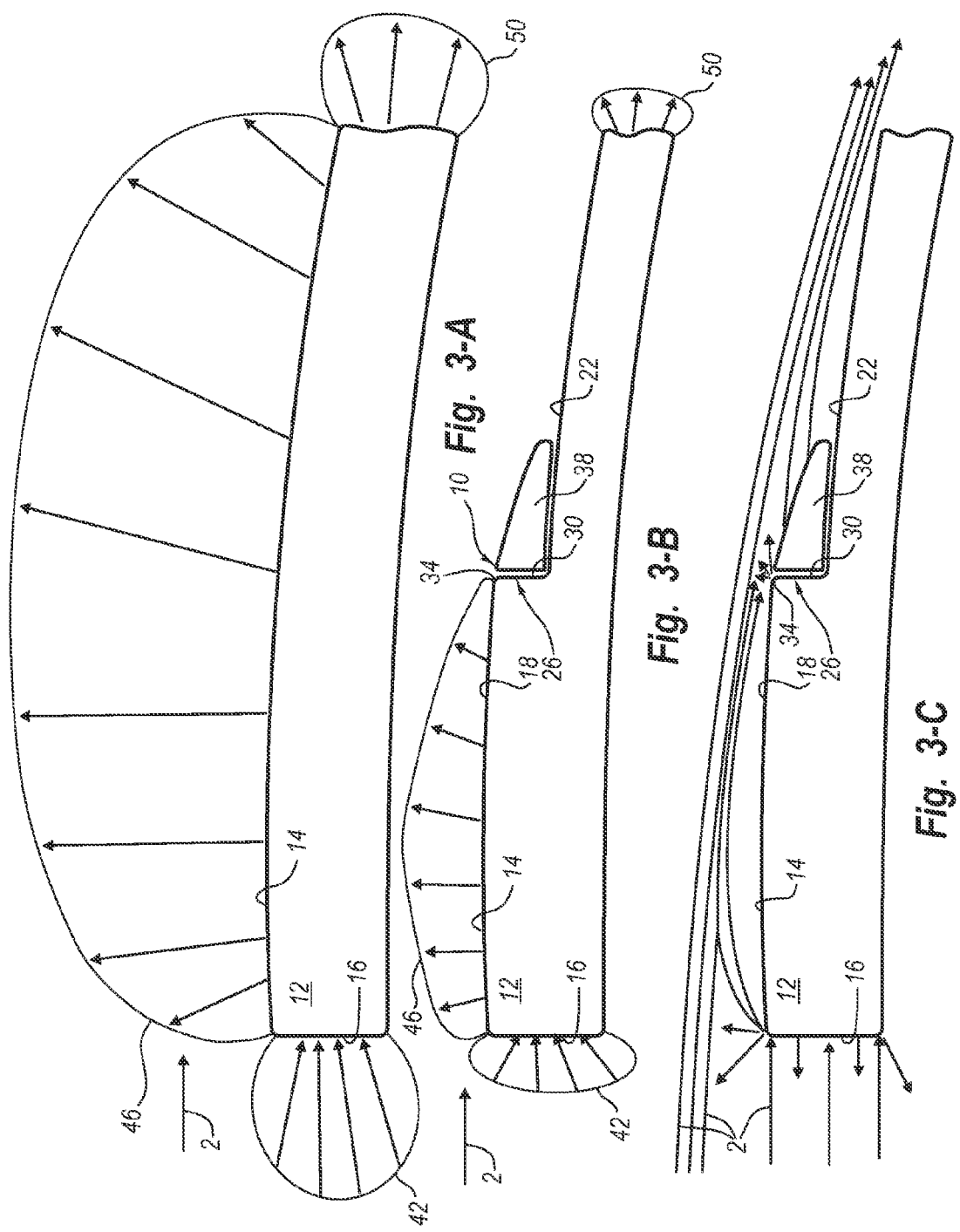

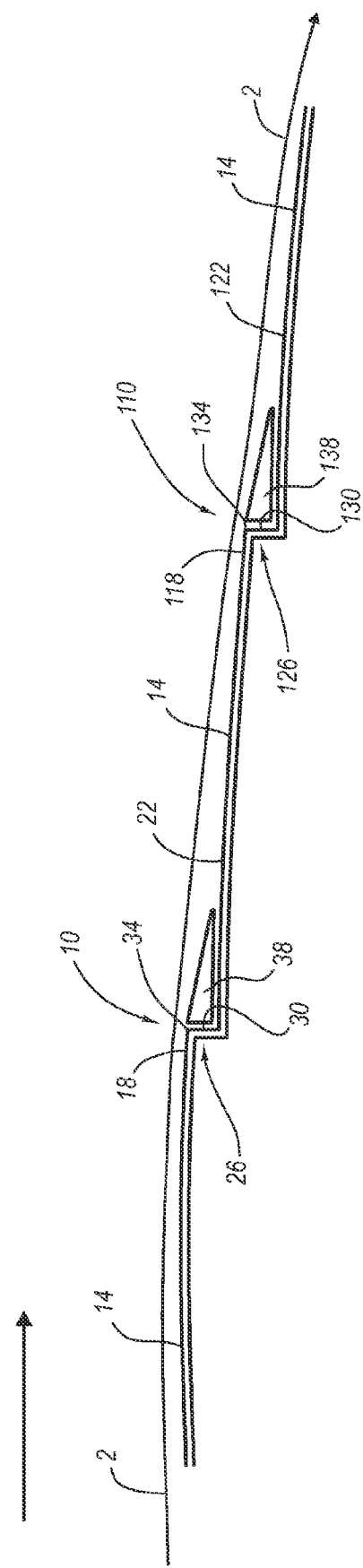

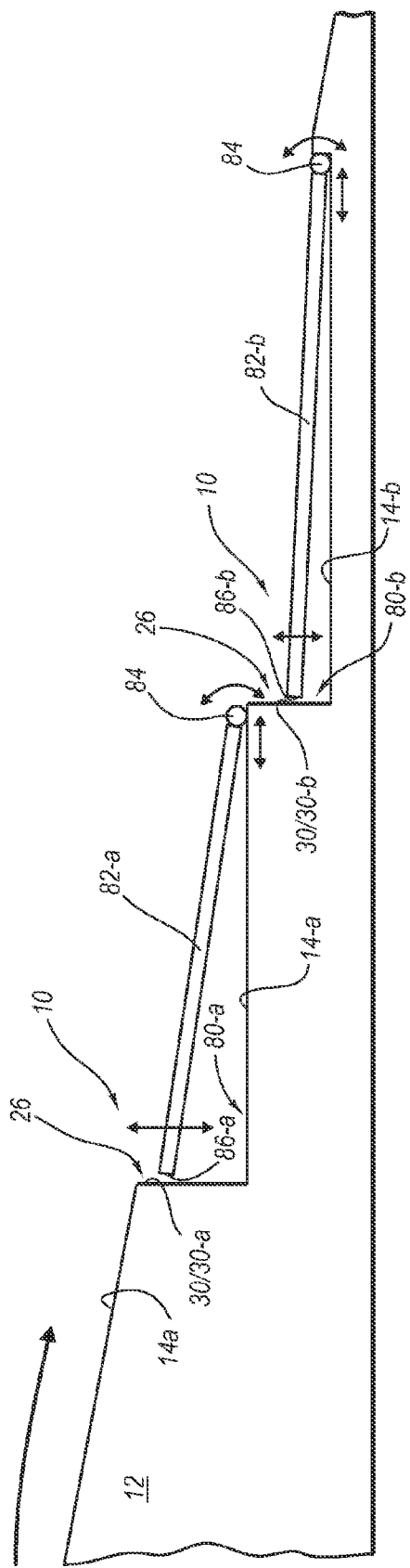
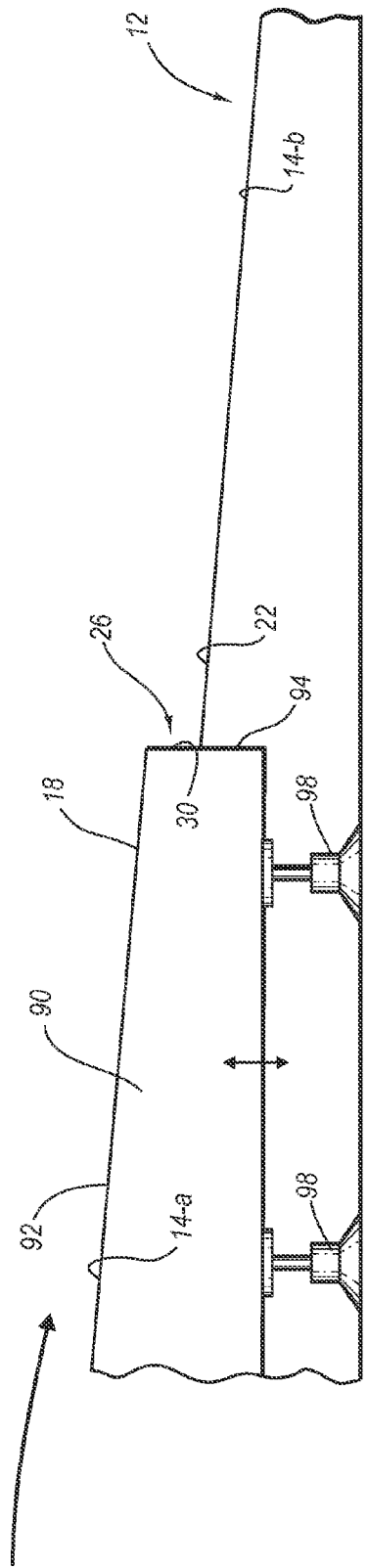
Fig. 7-A
Fig. 7-B

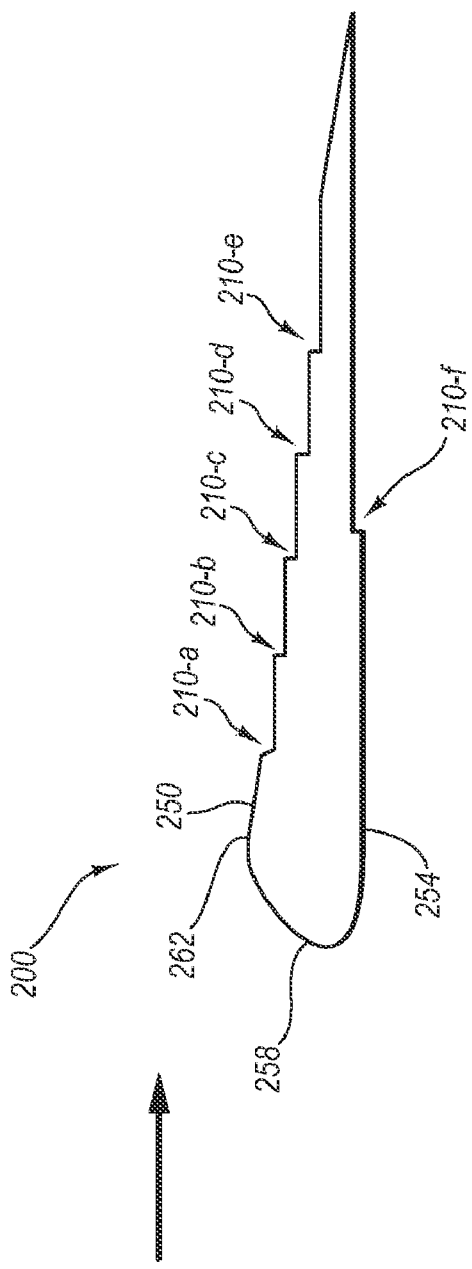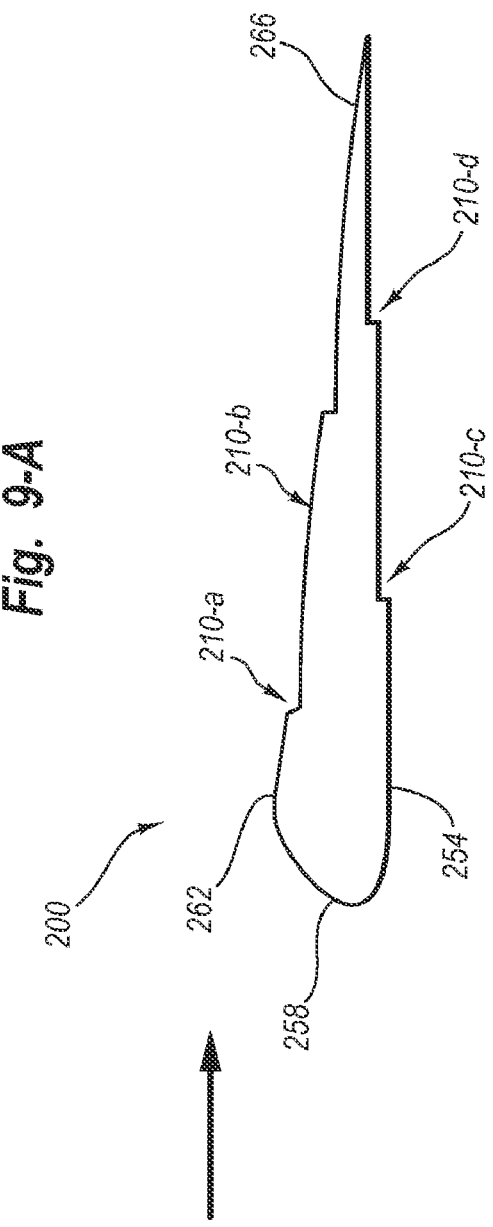
Fig. 9-A
Fig. 9-B

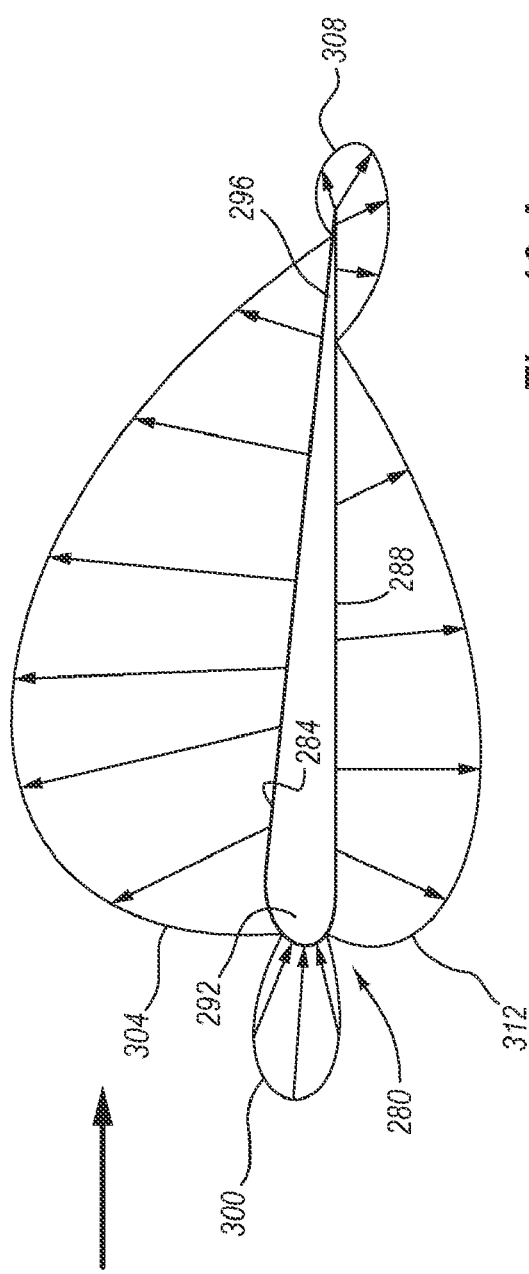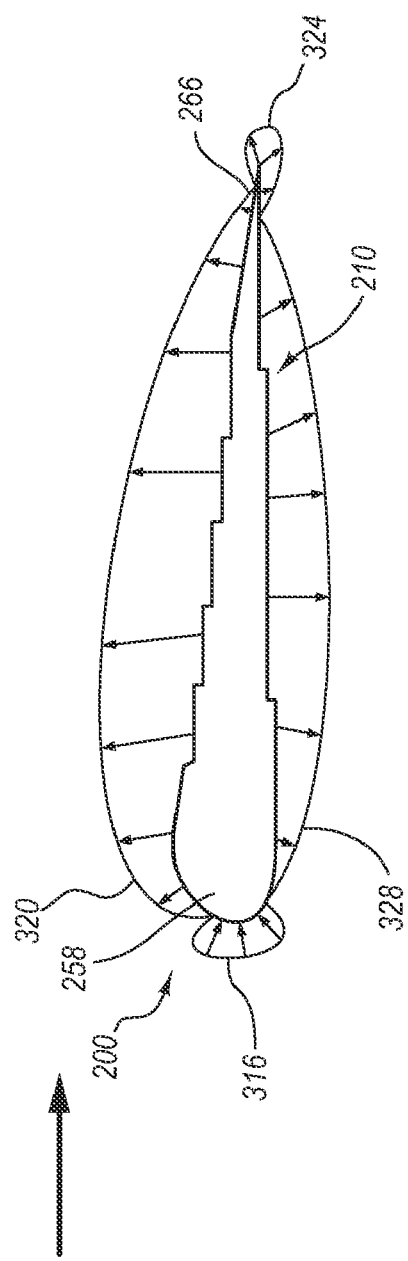
Fig. 10-A
Fig. 10-B

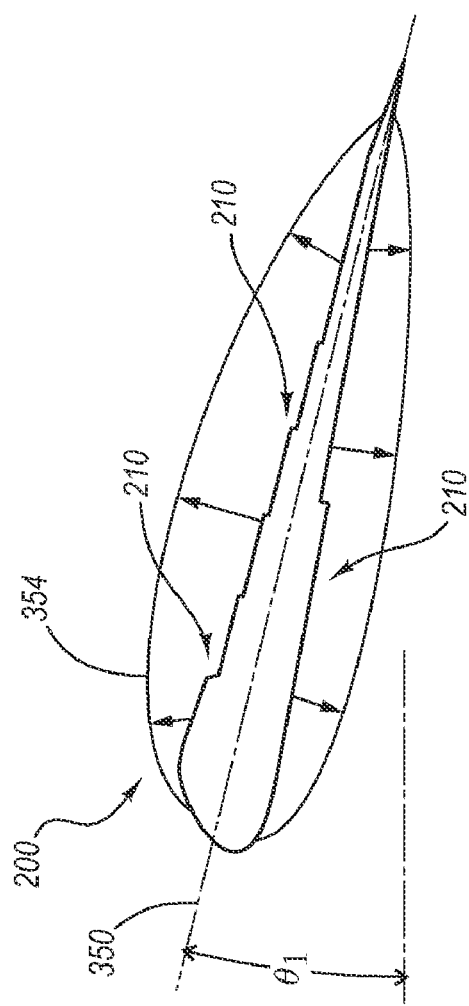
Fig. 11-A
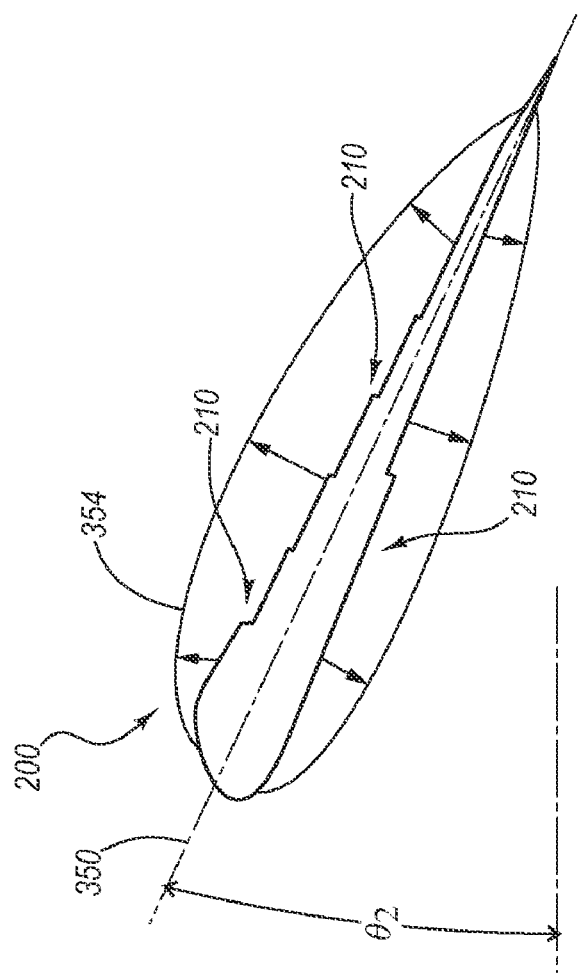
Fig. 11-B

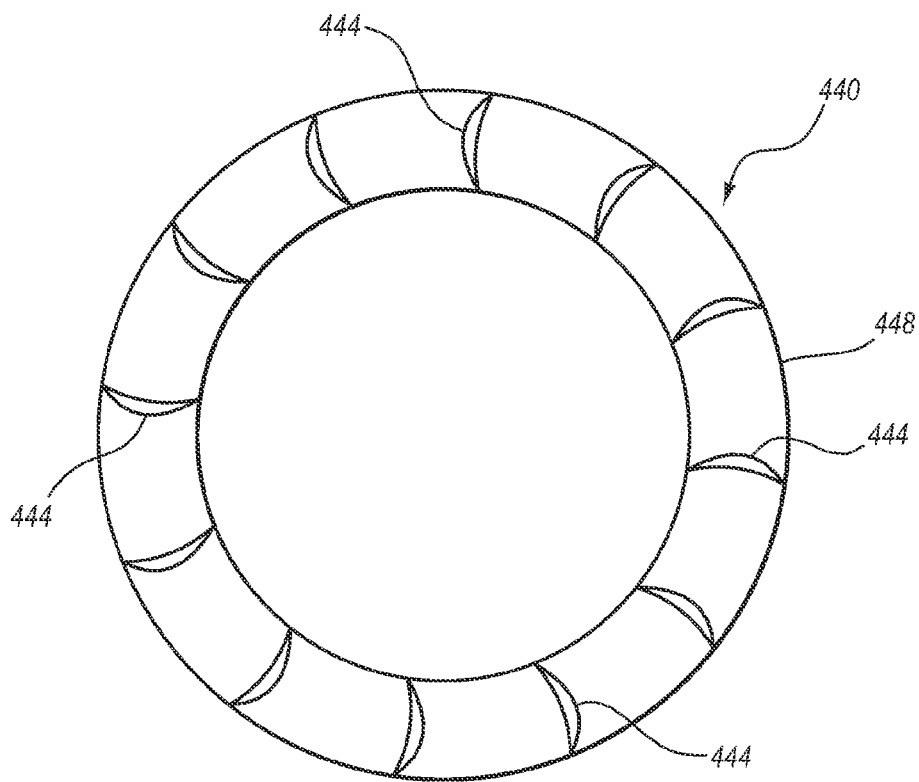
Fig. 13-A
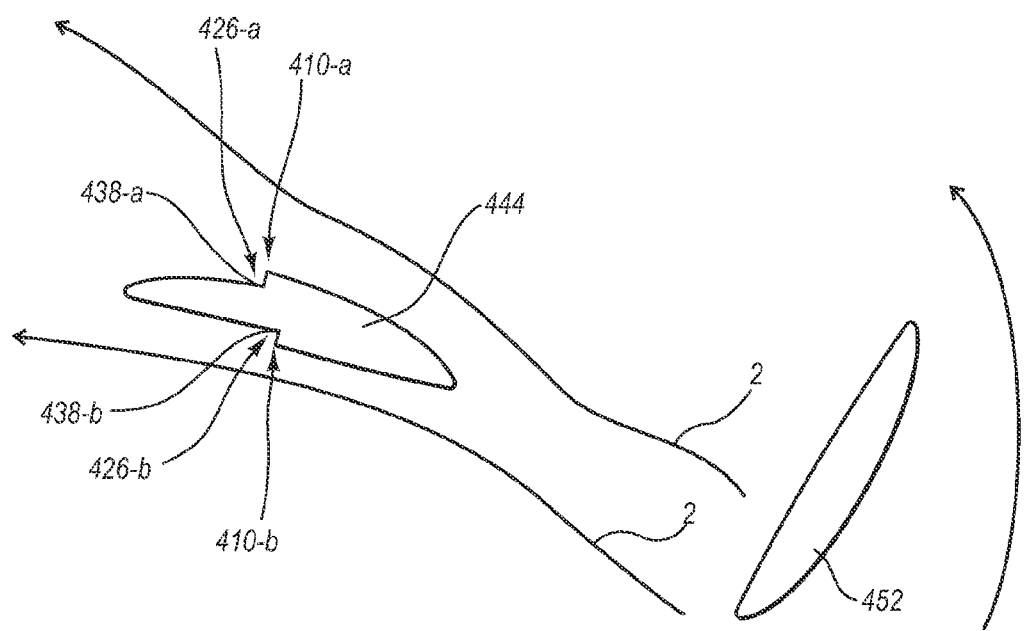
Fig. 13-B

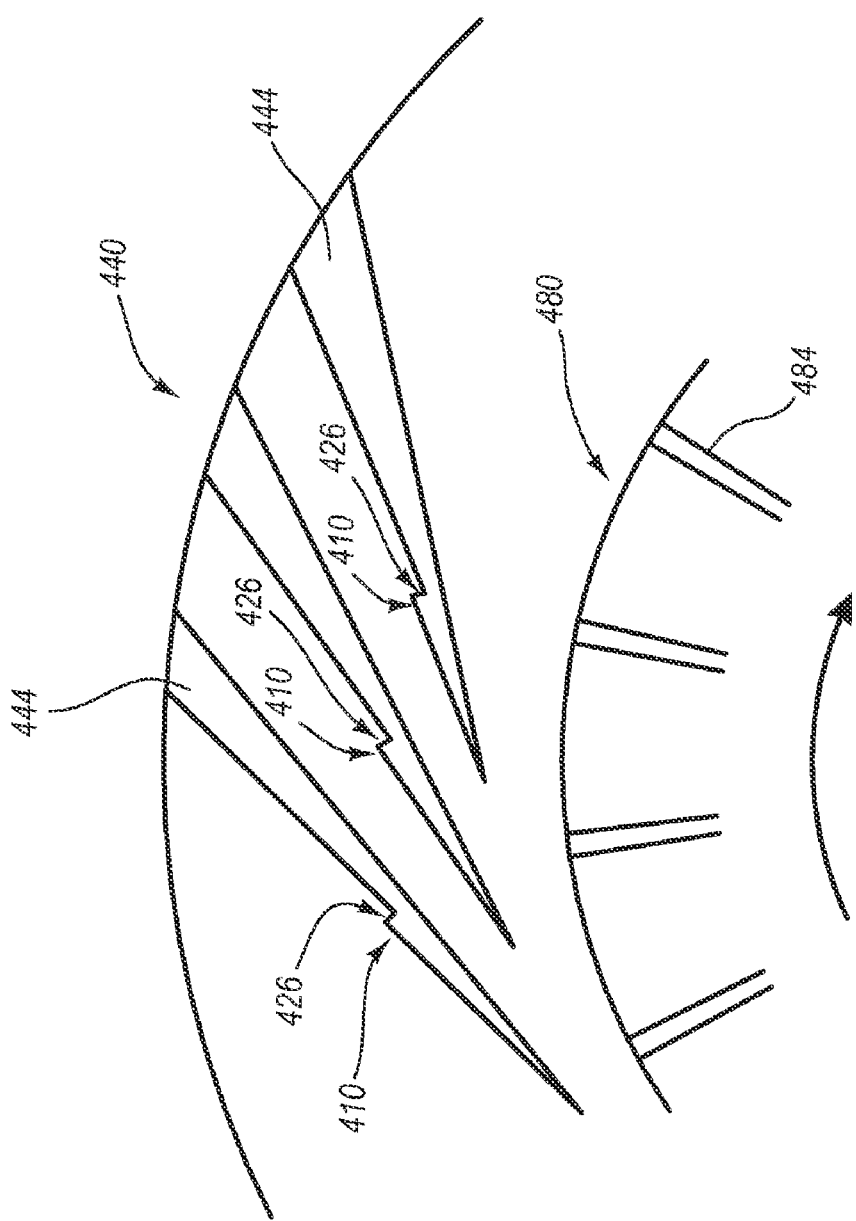
Fig. 13-C

METHOD AND SYSTEM FOR REGULATING EXTERNAL FLUID FLOW OVER AN OBJECT'S SURFACE, AND PARTICULARLY A WING AND DIFFUSER

RELATED APPLICATIONS

This application claims priority to U.S. Provisional Application Ser. No. 60/390,510, filed Jun. 21, 2002, and entitled, "System and Method for Using Surface Pressure Gradient Regulators to Control and Improve Fluid Flow Over the Surface of an Object," which is incorporated by reference in its entirety herein.

BACKGROUND

1. Field of the Invention

The present invention relates to external fluid flow across a blunt or streamlined body or object, and particularly, to a method and system for influencing and regulating the properties and characteristics of the fluid flow, and thus the fluid flow itself, across the surface of an object, such as a wing, which, in effect, optimizes the fluid flow, thus increasing the efficiency of the object, as well as the actual properties and characteristics of the fluid.

2. Background of the Invention and Related Art

As an object moves through a fluid, or as a fluid moves over the surface of an object, the molecules of the fluid near the object become disturbed and begin to move about the object. As the fluid continues to move over the object's surface, those molecules adjacent the surface of the object have the effect of adhering to the surface, thus creating negative forces caused by the collision of these molecules with other molecules moving in the free stream. The magnitude of these forces largely depends on the shape of the object, the velocity of fluid flow with respect to the object, the mass of the object, the viscosity of the fluid, and the compressibility of the fluid. The closer the molecules are to the object, the more collisions they have. This effect creates a thin layer of fluid near the surface in which velocity changes from zero at the surface to the free stream value away from the surface. This is commonly referred to as the boundary layer because it occurs on the boundary of the fluid. The collision of molecules at the surface of an object creates inefficient and unpredictable fluid flow, such as drag, and inevitably turbulence and vortexes.

Most things in nature try to exist within a state of equilibrium. The same is true for fluid flow over the surface of objects found in natural environments. For example, during a wind storm over the dessert, or a snow storm over a field, or even the sand on the beach as the water flows over and over, evidence exists that a state of equilibrium between the fluid flow and the surface over which the fluid is flowing is trying to be reached. As conditions are not perfect and the flow must be less than completely laminar, the surface of these natural conditions forms several sequential ripples or ledges that indicate the fluid and the surface are reaching as close a state of equilibrium as possible. Just like in nature, manufactured conditions and situations are equally not able to reach perfect conditions of fluid flow.

The study of aerodynamics over a surface has been extensive. However, over the years, the prevailing theory or idea has been that smoother or streamlined is better and operates to optimize fluid flow. As such, every conceivable manufactured device or system in which fluid passes over the surface of an object has been formed with the surface being as smooth and streamlined as possible.

The fields of fluid dynamics and aerodynamics study the flow of fluid or gas in a variety of conditions. Traditionally this field has attempted to explain and develop parameters to predict viscous material's behavior using simple gradient modeling. These models have enjoyed only limited success because of the complex nature of flow. Low velocity flow is easily modeled using common and intuitive techniques, but once the flow rate of a fluid or gas increases past a threshold, the flow becomes unpredictable and chaotic, due to turbulence caused by the interaction between the flowing material and the flow vessel. This turbulence causes major reductions in flow rate and efficiency because the flow must overcome a multi-directional forces caused by the turbulent fluid flow.

Attempts to improve flow rate and efficiency, scientists and engineers have traditionally accepted the principle that the smoother the surface the material is passing over, the lower the amount of turbulence. Thus efforts by scientists and engineers to improve flow and efficiency rates have generally focused on minimizing the size of the surface features across which the material is flowing. Because the turbulence is caused by micro-sized surface features, efforts to minimize these them have always been limited by the technology used to access the micro-sized world.

Turbulence occurs at the rigid body/fluid or gas interface also know as the boundary layer. The flowing material behaves predictably i.e. in a laminar fashion, as long as the pressure down flow remains lower than the pressure up flow. Generally as the rate of flow increases the pressure also increases, and the pressure gradient in the boundary layer becomes smaller. After a certain threshold is achieved, the flow closer to the rigid body is much slower than the flow outside the boundary layer, thus the pressure directly in the orthogonal direction from the rigid body is less than the pressure down flow. This causes the kinetic energy of the molecules in the boundary layer to move in the direction of the lowest pressure, or away from the rigid body. This change in the direction of the material, from moving in the direction of flow to moving across the direction of flow in the boundary layer creates vortices within the boundary layer and along the rigid body. These vortices create drag because the direction of flow as well as the kinetic energy of the particles is not in the down flow direction alone, but in a variety of directions. As a result, large amounts of energy are required to overcome the drag force, lowering the flow rate and efficiency.

Developments in the past few decades have improved on the traditional understanding of flow over a rigid body, resulting in advances in mathematical and computer modeling, as well as improved theoretical understanding of a material's behavior under non-ideal circumstances. Most of these advances have focused on improving the flow surface.

One such example of an improved flow surface is to use a rough flow surface that creates myriad miro-vortices much like a shark's skin or sand paper. It is thought that these small turbulence zones inhibit the creation of larger and more drag creating vortices. While these rough materials have been used in advanced racing yacht hulls as well as in swimming suite materials, there is still not a large improvement over smooth surfaces. Thus the state of the art is still struggling to understand turbulent flow beyond specific equations, and applications are still slowed by the drag and inefficiency caused by the turbulent flow.

SUMMARY AND OBJECTS OF THE INVENTION

The present invention seeks to offer a solution to much of the fluid flow problems across the surfaces of the several different types of objects, such as an airplane wing, as encountered in both controlled and natural environments. In its most general theoretical description, the present invention features a fluid flow regulator that functions to significantly influence fluid flow across the surface of an object. More specifically, the present invention fluid flow regulator functions to significantly regulate the pressure gradients that exist along the surfaces of a the object subject to either liquid or gaseous fluid and its flow. The controlled regulation of pressure gradients is accomplished by reducing the pressure drag at various locations along the surfaces, as well as the pressure drag induced forward and aft of the object, via a pressure recovery drop. Reducing the pressure drag in turn increases pressure recovery or pressure recovery potential, which pressure recovery subsequently lowers the friction drag along the surfaces. By reducing or lowering friction drag, the potential for fluid separation is decreased, or in other words, attachment potential of the fluid is significantly increased. All of these effects may be appropriately and collectively phrased and referred to herein as optimization of fluid flow, wherein the fluid flow, its properties and characteristics (e.g., separation, boundary layer, laminar vs. turbulent flow), and its relationship to the object are each optimized, as well as the performance of the object subject to the fluid flow.

The present invention describes a method and system for controlling the flow of a fluid over the surface of an object to improve the fluid flow by introducing at least one, and perhaps a plurality of, depending upon environmental conditions, fluid flow regulators that serve to regulate pressure, and to reduce the magnitude of molecule collision occurring within the fluid near the surface of the object, thus reducing turbulent flow or increasing laminar flow and reducing fluid separation. This is accomplished by controlling or regulating the pressure at any given area or point on the surface of the object using the fluid flow regulator. Likewise, the pressure may be regulated and fixed at a certain value depending upon the conditions under which the object is operating. Being able to regulate the pressure at any given area or areas on the surface of an object over which fluid may pass will provide for the direct regulation of velocity, density, and viscosity of the fluid as well. Controlling these parameters will allow the flow to be optimized for any conceivable condition or environment.

It is contemplated that the present invention is applicable or pertains to any type of fluid, such as gaseous fluids and liquids. For purposes of discussion, gaseous fluids, namely air, will be the primary focus.

In accordance with the invention as embodied and broadly described herein, the present invention further features a fluid control system and method for controlling the fluid flow over the surface of an object to optimize the flow of the fluid and to reduce its disruptive behavior. The fluid flow control system of the present invention utilizes one or more fluid flow regulators, or pressure gradient regulators, to create a sub-atmospheric barrier or a reduced pressure shield along the surface of an object, wherein the molecules of the boundary layer are unable to sufficiently adhere to the surface and collide with other molecules to create inefficient fluid flow. As such, these molecules flow across or over the surface of the object in a more efficient manner than known standard aerodynamic surfaces.

In a preferred embodiment, the fluid flow control system comprises: a fluid flowing at an identifiable velocity and pressure and having a specific density; an object having an identifiable surface area comprising the object's surface, wherein the fluid flow is introduced to and flows across at least a portion of the object's surface; and at least one fluid flow regulator formed within the object's surface, wherein a surface pressure may be regulated at any point along said surface, and wherein the fluid flow regulator comprises a drop point and a drop face extending from the drop point at a substantially perpendicular angle from the object's surface and existing in the direction of flow of said fluid to create a sub-atmospheric barrier, the fluid flow regulator designed to induce a sub-atmospheric barrier at the pressure gradient regulator on the object's surface, the fluid flow regulator ultimately causing a reduction of turbulence in and an increase in laminar flow of the fluid across the object's surface.

In an alternative embodiment, the fluid control system comprises a fluid flowing at an identifiable velocity and pressure; a first surface existing in a first plane and comprising a surface area, wherein the fluid flows across at least a portion of the first surface; a second surface also comprising a surface area, the second surface existing in a second plane that is offset from the first plane in a substantially parallel relationship, wherein the second surface extends from the first surface in the direction of flow of the fluid; and a fluid flow regulator relating the first surface to the second surface and comprising similar elements as described above, as well as the drop face of the pressure gradient regulator extends from the first surface at a substantially perpendicular angle.

The present invention further features a method for controlling the flow of a fluid over the surface of an object comprising the steps of obtaining an object subject to fluid flow, the object having one or more fluid carrying surfaces over which a fluid passes; and forming one or more fluid flow regulators in the fluid carrying surfaces, wherein the fluid flow regulators comprise similar elements and features as described above.

With proper selection of the design parameters of the one or more fluid flow regulators, the resulting disturbances in the laminar boundary at the surface of an object can be decreased so that boundary layer separation as described above, relative to where the separation would have occurred in the absence of a fluid flow regulator, may be virtually eliminated. The surface pressure gradient allows the pressure at any area on a surface to be regulated with the goal of achieving less turbulent and more laminar fluid flow across and leaving the surface of the object.

The present invention is applicable to any surface or object subject to fluid flow, and particularly to a wing and diffuser. In several preferred and exemplary embodiments, the present invention comprises or features one or more fluid flow regulators featured within an airplane wing, a diffuser, and any other similar devices or systems, wherein the fluid flow regulator is positioned preferably about one or more surfaces subject to fluid flow.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2-A illustrates a side cross-sectional view of an object having a surface and one or more fluid flow regulators therein;

FIG. 2-B illustrates a side cross-sectional view of an object having a surface and one or more fluid flow regulators therein, wherein said fluid flow regulator comprises a pressure recovery drop having a plurality of drop faces;

FIG. 2-C illustrates the touch and go phenomenon created by the present invention fluid flow regulators;

FIG. 3-A illustrates a side cross-sectional view of an object having a streamlined surface and the pressure gradients or pressure drag existing along the surface;

FIG. 3-B illustrates a side cross-sectional view of an object having a surface and one or more fluid flow regulators therein, as well as the pressure gradients or pressure drag existing along the surface;

FIG. 3-C illustrates a side cross-sectional view of an object having a surface and one or more fluid flow regulators therein, as well as the flow of fluid over the surface and the generated sub-atmospheric barrier;

FIG. 4 illustrates a side cross-sectional view of a plurality of fluid flow regulators situated along the surface of an object and the direction of airflow with respect to the fluid flow regulators;

FIG. 7-A illustrates a side cross-sectional view of one exemplary embodiment of a plurality of dynamic fluid flow regulators showing how the fluid flow regulators may be adjustable to accommodate varying conditions or fluid behavior across the surface of an object;

FIG. 7-B illustrates a side cross-sectional view of another exemplary embodiment of a plurality of dynamic fluid flow regulators showing how the fluid flow regulators may be adjustable to accommodate varying conditions or fluid behavior across the surface of an object;

FIG. 9-A illustrates a side cross-sectional view of an airplane wing having a plurality of fluid flow regulators along its upper and lower surfaces arranged in one exemplary pattern;

FIG. 9-B illustrates a side cross-sectional view of an airplane wing having a plurality of fluid flow regulators along its upper and lower surfaces arranged in another exemplary pattern;

FIG. 10-A illustrates a side cross-sectional view of a streamlined wing and the pressure gradients or pressure drag existing along the upper and lower surfaces of the wing;

FIG. 10-B illustrates a side cross-sectional view of a wing having a plurality of fluid flow regulators arranged in an exemplary pattern, as well as the effect these fluid flow regulators have on the pressure gradients and pressure drag existing on the upper and lower surfaces of the wing;

FIG. 11-A illustrates a side cross-sectional view of a wing having a plurality of fluid flow regulators incorporated therein, wherein the wing is at an identified angle of attack showing the magnitude of the pressure gradients or pressure drag on the wing at that particular angle;

FIG. 11-B illustrates a side cross-sectional view of a wing having a plurality of fluid flow regulators incorporated therein, wherein the wing is at a different identified angle of attack showing and comparing the magnitude of the pressure gradients or pressure drag on the wing at that particular angle;

FIG. 13-B illustrates a cross-sectional side view of a single vane of a diffuser as it is subject to fluid flow as generated by a turbine, wherein the diffuser vane features a a plurality of fluid flow regulators; and FIG. 13-C illustrates another exemplary embodiment of a diffuser comprising of featuring a plurality of fluid flow regulators in each of its vanes.

DETAILED DESCRIPTION OF THE PREFERRED EMBODIMENTS

Figure 1:
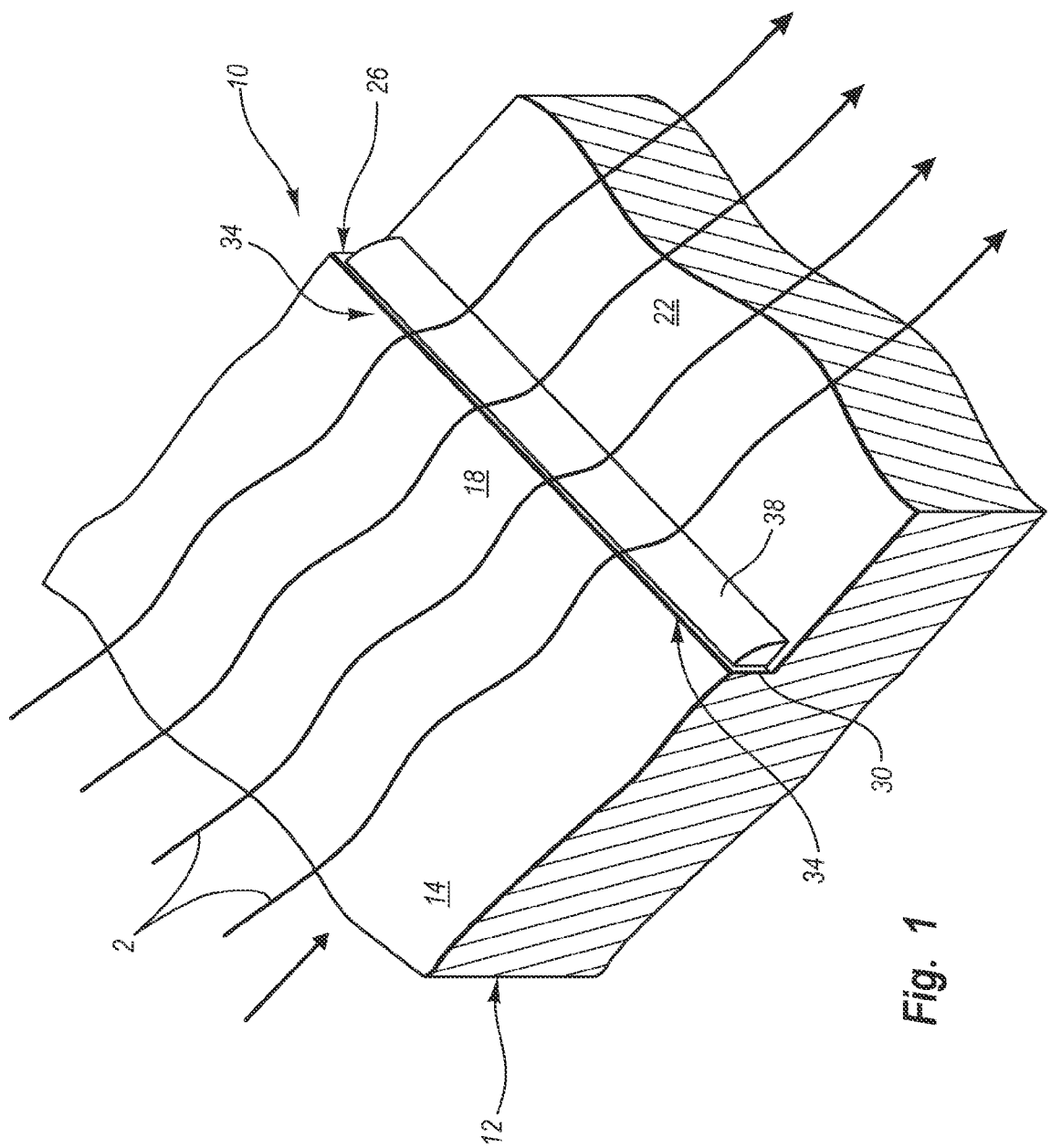
FIG. 1 illustrates an isometric cross-section of an object having a surface and one or more fluid flow regulators therein.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 13-C, is not intended to limit the scope of the invention, as claimed, but is merely representative of the presently preferred embodiments of the invention. The presently preferred embodiments of the invention will be best understood by reference to the Figures, wherein like parts are designated by like numerals throughout.

The following more detailed description will be divided into several sections for greater clarity and ease of discussion. Specifically, the following more detailed description is divided into three sections. The first section pertains to and sets forth a general discussion on improving and regulating external fluid flow over any object surface using the present invention systems and methods presented herein. The second section pertains to and sets forth a specific description of one exemplary object and surface employing the fluid flow regulating system and method of the present invention as set forth herein, namely wings and wing structures, along with several examples that detail the procedure and conditions of various wing tests or experiments conducted and the results of these tests. And finally, the third section pertains to and sets forth a specific description of another exemplary object and surface employing the fluid flow regulating system and method of the present invention as set forth herein, namely diffusers. These sections and the descriptions and embodiments within these sections, are not to be construed as limiting in any way, but are provided for the ease and convenience of the reader.

INFLUENCING, REGULATING, AND IMPROVING FLUID FLOW OVER ANY OBJECT'S SURFACE

The present invention seeks to provide new insight into the complex nature of fluid flow over an object's surface, and particularly external fluid flow, such as air or liquid fluid flow. Specifically, the present invention seeks to provide a shifting or altering of the current conceptual understanding of fluid flow over a surface by presenting various methods and systems that significantly improve, influence, and regulate fluid flow over the surface of an object, namely in terms of the mechanics, behavior, and characteristics of the fluid flow. Stated differently, the concepts underlying the systems and methods of the present invention, as well as the systems and methods themselves, as set forth herein, denote and suggest a profound paradigm shift from traditional and current thinking and concepts pertaining to fluid flow over an object's surface, and particularly pertaining to the common conception that streamlined or smooth surfaces are the best way to achieve optimal fluid flow and peak performance of the object or body in the flow. Having said this, although significantly altering current thinking, the present invention seeks to further the understanding of fluid flow and is designed to be utilized in conjunction with several of the technological developments and concepts relating to fluid flow that have developed over the years. As such, it is contemplated that the present invention will both frustrate and augment or supplement current fluid flow concepts and technology, depending upon their applicability to the present invention technology.

As discussed above, the study of fluid flow over the last several decades has been immense, with new ideas and technologies developing at a rapid pace. However, as also. discussed above, one core fundamental concept regarding fluid flow over an object's surface, upon which mass of studies and development of technology has been based, has always been assumed—that a smooth or streamlined surface is the best possible surface for achieving optimal fluid flow. However, as is shown herein, it is believed that this core fundamental concept is somewhat flawed, and that it is upon this basis that the present invention seeks to offer or presents a paradigm shift in the complex field of external fluid mechanics. Simply stated, the present invention will allow the design of objects, bodies, devices, and systems otherwise thought to be optimal to be improved upon.

Typically, an object that is moving through a fluid or that has a fluid passing over it experiences different types of aerodynamic forces. As the fluid flows over the object, the molecules in the fluid are disturbed and try to move around the object so that they can equalize themselves once again. Aerodynamic forces and their magnitude are dependent upon several factors, as discussed herein. However, two very important factors are the viscosity of the fluid and the compressibility of the fluid. In regards to viscosity, as fluid passes over the surface of an object a boundary layer is created. This boundary layer acts as a molecular barrier of fluid particles between the free flowing fluid and the object surface. The boundary layer may separate from the surface and may also contribute to the drag forces on the object.

Drag forces manifest themselves in the form of pressure drag forces (pressure drag) and friction drag forces (friction drag), which are both related to one another. Friction drag results from the friction between the molecules in the fluid and the molecules in the surface as the fluid passes over the surface. Pressure drag is generated by the eddying motions that are created in the fluid by the passage of the fluid over the object. Pressure drag is less sensitive to the Reynolds number of the fluid than friction drag. Although both pressure and friction drag are directly related to the viscosity of the fluid, it is useful to define each of these and their characteristics because they each are the result of different flow phenomena. Frictional drag is more of a factor during attached flow where there is little or no separation and it is related to the surface area exposed to the fluid flow. Pressure drag is an important factor when discussing and analyzing separation and its starting points and is related to the cross-sectional area of the object.

The compressibility of the fluid is also important. As fluid passes over the surface of an object, the molecules in the fluid move around the object. If the fluid is dense, such as water, the density will remain constant, even at higher velocities. If the fluid is not as dense, such as with air, the density will not remain constant (except at low speeds—typically less than 200 mph). Instead, the fluid will become compressed, thus changing the density of the fluid. As the density changes, the forces induced upon the object by the fluid will also change. This is even more true at higher velocities.

In its broadest implication, or in its highest level of abstraction, the present invention describes a method and system for influencing and regulating fluid flow, namely its properties or characteristics and behavior, over an object's surface, wherein the system comprises one or more fluid flow regulators strategically designed and positioned along the surface of the object. The method comprises introducing or incorporating or featuring one or more fluid flow regulators onto/into/ with the object's surface, by creating a surface featuring a fluid flow regulator, or altering an existing surface to comprise one or more fluid flow regulators. In a preferred embodiment, the fluid flow regulator comprises a Dargan™ fluid flow regulator having a Dargan™ drop, that induces or generates a Dargan™ barrier, which technology is designed and owned by Velocity Systems, Ltd. of Salt Lake City, Utah 84111.

With reference to FIGS. 1 and 2, shown is an isometric view and a side view, respectively, of a segment of an object 12 having a surface 14 thereon. Incorporated into surface 14 is a fluid flow regulator 10 designed to both influence, control, and regulate the flow of fluid 2 (indicated by the direction arrow in each of the Figures herein) over surface 14 of object 12. Structurally, fluid flow regulator 10 comprises a leading edge 18, a trailing edge 22, and a pressure recovery drop 26 strategically placed at an optimal pressure recovery point 34, so as to induce or create a sub-atmospheric barrier 38 at its base. Pressure recovery drop 26 comprises one or more drop faces 30 therein.

Leading edge 18 is an area of surface or a surface area existing on surface 14 that leads into a pressure recovery drop 26, or a Dargan drop, that is positioned as close to an optimal pressure recovery point 34, as possible. An optimal pressure recovery point is defined and discussed below. As such, depending upon different conditions and situations, there may be one or a plurality of optimal pressure recovery points along one particular surface, thus calling for one or a plurality of fluid flow regulators 10 (see FIG. 4). It could also be said that leading edge 18 is a surface area that extends outward in a rearward direction from the top of drop face 30 of pressure recovery drop 26 an identified distance, or that leading edge 18 is a surface area that precedes pressure recovery drop 26, each with respect to the direction of fluid flow. Leading edge 18 may be of any size and shape as desired or called for as dictated by design parameters. However, it should be noted that leading edge 18 must be of sufficient length to receive fluid flow 2 thereon, or contribute to the flow of fluid on surface 14.

Pressure recovery drop 26 is part of or is an extension of surface 14 and leading edge 18. Structurally, pressure recovery drop 26 is preferably orthogonal and comprises a surface area or drop face 30 that is perpendicular or substantially perpendicular to leading edge 18, and preferably ninety degrees 90° perpendicular. Pressure recovery drop 26 extends perpendicularly in a downward direction from leading edge 18 so that it comprises an identified and predetermined height. In other words, pressure recovery drop extends between leading edge 18 and trailing edge 22 and exists or is postured in a sub-fluid arrangement, such that the fluid 2 will always encounter pressure drop 26 from leading edge 18 and fall off of drop face 30. This is true no matter how surface 14 is oriented (e.g., horizontal, vertical, on an angle, etc.). Fluid flow in the opposite direction so that it flows up pressure recovery drop 26 is not intended and is contrary to the present invention.

Pressure recovery drop 26 is positioned at a location as precisely proximate an optimal pressure recovery point 34 as possible, the reason being explained in detail below. The distance that pressure recovery drop 26 extends from leading edge 18, or the height of drop face 30 is critical. The greater the height, the greater the pressure drop and the more pressure drag is reduced, which leads to an increase in pressure recovery at the surface and greater reduction in friction drag. All of this functions to increase the fluid attachment potential, or stated another way, reduce the separation potential of the fluid. Conversely, the shorter the height of drop face 30, the less pressure drag is reduced. The less pressure drag is reduced, the less pressure recovery there will be at the surface, which subsequently leads to less fluid attachment potential. Therefore, the height of drop face 30 is specifically calculated for every fluid flow situation that an object might encounter, which drop face height is predetermined prior to or during fluid flow. The calculation of the height of drop face 30 is based upon several design, fluid, and other physical factors, as well as on several environmental conditions. Some of these factors or conditions include the particular type of fluid flowing over the object's surface, the velocity of fluid, the viscosity of fluid, the temperature of fluid, the direction of the flow of the fluid, the type and texture of the surface, the geometric area of the object's surface both before and after the pressure recovery drop, the magnitude or range of pressure existing on object's surface, the orientation of the object within or with respect to the fluid, and any others. For example, the height of drop face 30 may not need to be as high if the surface is a prop or boat hull traveling through water because the pressure recovery will be quick. On the other hand, for similar flow properties and/or characteristics of an object flowing through air, the height of drop face 30 may be much greater to achieve the same optimal flow characteristics as the pressure recovery will be slower as compared to the pressure recovery along an object's surface in water. Thus, from this it can be seen that drop face 30 is, among other things, very density dependent. Pressure recovery drop 26 may also be variable in that it's height may be adjustable to account for changing or varying factors/conditions. This is especially advantageous because external flow exists, for the most part, within an uncontrolled environment where the properties and characteristics of the fluid are volatile and may change or vary in response to changing conditions or other influencing factors, such as the presence, speed, size, and shape of an object.

Trailing edge 22 is similar in structure to leading edge 18, only instead of preceding pressure recovery drop 26, trailing edge 22 follows pressure recovery drop 26 with respect to the direction of fluid flow so that fluid flow 2 passes over leading edge 18, then pressure recovery drop 26, and then finally trailing edge 22. Trailing edge 22 extends outward in a forward direction from pressure recovery drop 26, and particularly from the bottom of drop face 30. Just like leading edge 18, trailing extends an identified distance and provides a trailing flow boundary for said fluid. Both leading edge 18 and trailing edge 22 are defined in relation to the direction of fluid flow (represented by the arrows).

In the embodiment shown in FIGS. 1 and 2, leading edge 18 and trailing edge 22 are integrally formed with surface 14 so that they are actually part of surface 14. Other embodiments, shown and described below, are presented herein where leading edge and/or trailing edge are not integrally formed with surface 14. moreover, FIGS. 1 and 2 illustrate only a single fluid flow regulator 10, wherein the present invention contemplates the use of one or a plurality of such regulators along a single surface, depending upon several factors, including design requirements of the object, fluid flow, fluid type, environmental factors, and any others relating to fluid flow over a surface.

As stated above, the present invention recognizes what may be termed as an optimal pressure recovery point 34. Optimal pressure recovery point 34 is defined herein as the point(s) or location(s) about surface 14 at which there is an imbalanced or unequal pressure gradient forward and aft of fluid 2, thus creating adverse pressure within internal flow device 12, which adverse pressure gradient induces friction and pressure drag that ultimately increases the separation potential of fluid 2. As such, the presence of adverse pressure signals less than optimal flow. The location of each optimal pressure recovery point is a calculated determination that dictates the placement of fluid flow regulators 10.

Since fluid flow may separate at various locations, surface 14 may comprise several optimal pressure recovery points 34. As fluid 2 travels over surface 14 of object 12 it possesses identifiable or quantifiable characteristics and parameters with regards to its velocity, drag ratio, pressure, density, viscosity, and others. These are largely determined by the existing environmental conditions, as well as the particular design parameters and characteristics of the object and its surface, such as shape, size, texture, and other aerodynamic or design factors. Thus, as fluid 2 flows over surface 14, these parameters are defined. However, at the same time they are continuously changing as dictated by the same factors. Thus, fluid 2 will possess certain characteristics, properties, and behavior just prior to its introduction across surface 14 of object 12. Once introduced to object 12, fluid 2 will undergo many influencing forces caused by the moving or dynamic object 12 passing through fluid 2 or fluid 2 passing over a stationary object 12. These influencing forces will, among other things, disrupt the equilibrium of the fluid, induce pressure differentials or gradients, and cause fluid separation; and all along surface 14, fluid 2 will try to compensate and stabilize or equalize itself. This disruption is even more evident as fluid 2 leaves surface 14. Often, leaving surface 14 will induce the greatest amount of disruption or turbulence in fluid 2 as the fluid must abruptly leave a surface to which it is trying to adhere. During this transitional period from the time a fluid exists prior to introduction to an object, to the time the fluid is passing over or through the surface, to the time the fluid leaves the surface of the object has been the focus of years of study and experimentation. As discussed above, significant strides in these areas have been made, but serious problems associated with boundary layers, fluid separation, pressure equilibrium, drag, and turbulent vs. laminar flow still remain.

With reference to FIGS. 2-A, 2-B, and 2-C, and particularly 2-C, shown is an exemplary object 12. FIG. 2-C illustrates the effective "touch and go" or pulse flow phenomenon created by fluid flow regulators 10 featured over surface 14 of object 12. Specifically, FIG. 2-C illustrates a cross-sectional view of object 12. As can be seen, fluid 2 flows over surface 14 initially at front surface 15 and leaves at trailing surface 17. What happens between as fluid 2 passes over surface 14 of object 12 is unique to the present invention. As fluid 2 initially contacts front surface 15, it begins its flow across surface 14, wherein various fluid dynamic forces act upon fluid 2, thus inducing a state of imbalance within fluid 2. This imbalance induces an adverse pressure gradient that, if left unregulated, will cause fluid 2 to detach from surface 14 and become very turbulent. As such a fluid flow regulator 10 is precisely positioned at an optimal pressure recovery point 34. Optimal pressure recovery point 34 is defined herein as a location about surface 14 at which attached fluid comprises a pressure differential that generates an adverse pressure gradient acting to induce fluid separation.

As such, optimal pressure recovery points 34 are pre-determined and defined for each object and for each intended operating condition. Moreover, a fluid flow regulator is never randomly positioned, but instead strategically placed at an optimal pressure recovery point. Thus, first fluid flow regulator 10-*a* of FIG. 2-C in the direction of fluid flow is correctly positioned at optimal pressure recovery point 34-*a* as this location will provide the ability to regulate the pressure gradient in fluid 2 as needed.

To regulate the inherent pressure gradient, first fluid flow regulator 10-*a* performs a pressure recovery function. As fluid 2 contacts front surface 15 and travels about surface 14 it encounters fluid flow regulator 10-*a* comprising a pressure recovery drop 26-*a* and drop face 30-*a*. As fluid passes over pressure recovery drop 26-*a* it encounters sub-atmospheric barrier 38-*a*. Because this is a low pressure barrier, fluid 2 literally drops off of pressure recovery drop 26 and contacts surface 14 as indicated by the arrows. The fluid then briefly detaches from surface 14 (indicated by the upward arrows) and then subsequently reattaches almost instantaneously, wherein fluid 2 is re-energized. This "touch and go" phenomenon functions to recover pressure at the optimal pressure recovery point 34-*a*, wherein the pressure gradient is reduced and the pressure differential cured. All of this effectually allows fluid 2 to continue in an attached state, as well as in a returned state of equilibrium. The drop in pressure is made instant so that the adverse dynamic forces acting on fluid 2 may be overcome and eliminated.

It is recognized that fluid 2 may still comprise somewhat of a pressure differential downstream from fluid flow regulator 10-*a*. In addition, it is recognized that fluid flow conditions within an internal flow device may change or vary. Therefore, object 12, and particularly surface 14, may comprise or feature several optimal pressure recovery points 34 requiring a plurality of fluid flow regulators. In this case, it becomes necessary to determine the location of subsequent optimal pressure recovery point(s) 34, shown as pressure recovery point 34-*b*. The location of second optimal pressure recovery point 34-*b* downstream from primary or first optimal (pressure recovery point 34-*a* is also pre-determined and comprises a calculated location determined prferably as follows. Once fluid 2 passes over primary optimal pressure recovery point 34-*a* it briefly separates, then reattaches in a re-energized state as discussed above. However, if pressure gradients remain in fluid 2 these must be equalized or the flow of fluid 2 within internal flow device is not truly optimal or optimized. As such, second fluid flow regulator 10-*b* is placed at optimal pressure recovery point 34-*b*. The location of second pressure recovery point 34-*b* is located at a location at least past the point at which fluid 2 re-attaches after encountering and passing over fluid flow regulator 10-*a* and pressure recovery drop 26-*a*. If second fluid flow regulator 10-*b* is placed at a location on surface 14 encountered by fluid 2 prior to it reattaching to surface 14, then the disruption in fluid 2 is only exacerbated and the fluid will be significantly less than optimal. This is because as fluid 2 drops over first or primary pressure recovery drop 26-*a* and detaches from surface 14, it suddenly expends its energy stored within the molecules making up fluid 2. This energy is retrieved as fluid 2 reattaches to surface 14. If second fluid flow regulator 10-*b* is placed at a location where the fluid is in this detached state, the second drop in pressure would induce a significant adverse pressure gradient that would cause the fluid to eddy and become extremely turbulent. As such, second fluid flow regulator 10 should be placed at at least a location, such that at the time fluid 2 encounters second fluid flow regulator 10-*b* it is reattached and re-energized. At such an optimal location, fluid 2 may then pass over second fluid flow regulator 10-*b* with the same results as discussed above as it passed over first fluid flow regulator 10-*a*. This continuous "touch and go" phenomenon may be repeated as often as necessary until fluid 2 is in its maximized optimal state of attached flow. By providing multiple fluid flow regulators, the flow of fluid 2 may be said to be "pulsed," or rather object 12 comprises pulsed fluid flow about its surface(s) caused by the sudden and multiple pressure recovery drops.

The present invention functions to significantly improve fluid flow over a surface of an object and to eliminate the problems of prior art aerodynamic surfaces intended to encounter fluid flow. Although not all properties, functions, characteristics, parameters, relationships, and effects are entirely understood, the present invention seeks to set forth a unique way of influencing the behavior of fluid over a surface. In the present invention, as fluid 2 flows over at least a portion of surface 14 it is disrupted from its current existing and substantially equalized state. Most likely, due to several factors, the fluid will become more turbulent as the molecules of the fluid interact with and pass over the molecules of surface 14. An increase of turbulence typically means an increase of pressure drag leading to a decrease in velocity of the fluid, as well as an increase in the density and viscosity of the fluid. However, the present invention is designed to reduce this disruption, and thus the turbulence, of the fluid by reducing the overall pressure drag and friction drag. Reducing each of these will significantly increase the pressure recovery potential of the surface, which will, in turn, increase the attachment potential of the fluid (or decrease the potential for separation of the fluid). Increasing the attachment potential functions to create a much more laminar and efficient flow of fluid 2 over surface 14.

To accomplish the functions just described, object 12, and particularly surface 14 has formed therein at least one, and preferably a plurality of, fluid flow regulators 10. Thus, as fluid 2 flows across surface 14, it encounters fluid flow regulators 10, and particularly pressure recovery drop 26. At this precise point or location, which is shown as optimal pressure recovery point 34, there is a significant and immediate or sudden reduction in pressure or drop in pressure caused or induced by fluid flow regulator 10, and particularly pressure recovery drop 26, such that fluid 2 essentially drops over or falls off of pressure recovery drop 26, which results in a significant reduction in pressure drag. This sudden drop in pressure creates a sub-atmospheric barrier or shield 38 directly at the base of pressure recovery drop 26. Sub-atmospheric barrier 38 is a low pressure area that essentially creates a barrier or cushion between surface 14 and fluid 2. This barrier is created and exists directly adjacent drop face 30 where it is the strongest. The farther away from pressure recovery drop 26 along surface 14, barrier 38 decreases as is illustrated by the tapering off of barrier 38 as the distance from pressure recovery drop 26 increases. Essentially what is happening is that the sudden drop in pressure that occurs at pressure recovery drop 26 is the greatest, thus creating the strongest barrier. As the distance away from pressure recovery drop 26 increases in the direction of fluid flow, the pressure on surface 14 begins to increase and sub-atmospheric barrier 38 begins to dissipate or diminish. At the instance of sudden pressure drop, the pressure coefficient (a non-dimensional form of the pressure defined as the difference of the free stream and local static pressures all divided by the dynamic pressure) at the base of drop face 30 is increased. As stated, sub-atmospheric barrier 38 is a low or reduced pressure area. It's function or effect is to decrease the molecular activity occurring between the molecules at surface 14, the boundary layer, and those existing within the free stream of fluid 2. This reduction in molecular activity may be described as a reduction in the kinetic energy of the molecules, which kinetic energy increases the tendency of the molecules present within fluid 2 to adhere or stick to surface 14, a phenomenon commonly referred to as skin friction drag, surface viscosity, or friction drag. These forces are directly related to the surface texture, the molecular movement and interaction at the surface of an object, as well as the magnitude of turbulence experienced by the fluid across the surface, and contribute to such phenomenon as vortices, a problem often associated with aircraft flight.

Sub-atmospheric barrier 38 comprises a low pressure area of fluid molecules possessing decreased kinetic energy. The decrease in kinetic energy is a result of the sudden drop in pressure induced at or by pressure recovery drop 26. These low energy molecules effectively provide a barrier between the higher or more energetic molecules in the free stream of fluid and the molecules of the surface. Stated another way, sub-atmospheric barrier 38 functions to cushion the more energetic molecules in the free stream from the molecules in the surface of the object. What results is a much for laminar flow and an increase in attachment potential, or decrease in separation potential because the fluid is in a greater state of equilibrium.

The present invention fluid flow regulator 10 may also be termed a surface pressure gradient regulator because of its ability to regulate or control or influence pressure gradients along the surface of an object, as well as pressure drag and pressure recovery across surface 14. It is a well know fact that a fluid will follow the path of least resistance. The pressure gradient regulator allows us to regulate the pressure fields at the boundary layer of any said surface. This manipulation of pressures will allow us to manipulate the flow field of a fluid in motion around an object. The ability to regulate pressure drag stems from the sudden pressure drop at the optimal pressure recovery point 34, which pressure drop induces or creates a sub-atmospheric barrier 38 that functions to improve the flow of a fluid across surface 14 of object 12. Specifically, the present invention sub-atmospheric barrier 38 improves fluid flow by reducing pressure and friction drag and turbulence. This is accomplished by creating a cushion of low pressure that reduces the degree and intensity of molecule collisions occurring at the boundary layer that leads to separation of the fluid from surface 14. Thus, as a fluid 2 passes over each of the small, strategically placed, fluid flow regulators 10, there will be experienced a significant and sudden drop in pressure of fluid 2, resulting in an increase in the pressure coefficient. Naturally, as the pressure drops at pressure recovery drop 26, there is experienced an increase in the velocity of fluid 2, wherein this increase in velocity naturally results in a decrease in the density of fluid 2. This decrease in density at the boundary layer, functions to reduce the number of molecules capable of colliding with the molecules existing within the free stream of fluid 2 at the boundary layer. Subsequently, this reduction in experienced molecule collisions at the boundary layer reduces separation of fluid 2 and improves the overall efficiency of the flow of fluid 2, thus decreasing drag and turbulence, and ultimately creating a much more efficient aerodynamic surface.

FIG. 2-B illustrates a side cross-sectional view of an object 12 having a surface 14 and one or more fluid flow regulators 10 therein, wherein said fluid flow regulator 10 comprises a pressure recovery drop 26 having a plurality of drop faces therein, shown as drop faces 30-*a* and 30-*b*. In this embodiment, fluid flow regulator 10 induces multiple pressure drops creating sub-atmospheric barriers 38-*a* and 38-*b*, which each function to optimize fluid flow. Specifically, as fluid 2 encounters pressure recovery drop 26, it becomes subject to drop face 30-*a* and a sudden pressure drop is induced, thus generating sub-atmospheric barrier 38-*a*. Immediately following drop face 30-*a* is drop face 30-*b*. Thus, fluid 2 immediately encounters drop face 30-*b* and induces a second sudden or immediate pressure drop, thus generating second sub-atmospheric barrier 38-*b*. The advantage of building in a plurality of drop faces 30 into pressure recovery drop 26 is that fluid 2 is influenced to an even greater degree, with all of the effects discussed herein magnified.

Fluid flow regulator 10 and it associated method provides the ability to achieve the greatest state or equalization and/or harmony between the molecules in fluid 2 and surface 14 of object 12 over which fluid 2 passes. Equalization or harmony between fluid and surface molecules is increased significantly as fluid 2 and the molecules directly adjacent surface 14 (those in the boundary layer) interact less violently as a result of sub-atmospheric barrier or shield 38 created by fluid flow regulator 10.

With reference to FIGS. 3-A, 3-B, and 3-C, shown is the relationship of fluid flow 2 over surface 14 of object 12 to pressure. When an object experiences fluid flow across one or more of its surfaces, the object becomes subject to, among other things, pressure drag and friction drag. Each of these decrease the efficiency of fluid flow, as well as cause the fluid to flow more turbulently than laminar. Indeed, the less pressure drag and friction drag that is induced across the surface the more laminar the flow across that surface will be. Just the opposite is also true. The greater the pressure drag and friction drag induced across the surface, the more turbulent the flow across the surface will be.

As can be seen from FIG. 3-A, a smooth or semi-smooth surface 14 is presented and introduced to fluid flow 2. Upon initial contact of fluid 2 with a front portion 16 of object 12, a significant amount of pressure drag is induced on front portion 16, illustrated as pressure drag 42. As the fluid progressively passes over surface 14, fluid 2, or rather the molecules within fluid 2, react with the molecules of surface 14, wherein a significant amount of surface friction is induced, known and illustrated as friction drag 46. The further along surface 14 fluid 2 travels, the greater the disturbance in flow that is caused by this friction drag. This has the effect of increasing the pressure along surface 14. In other words, there is an upward pressure distribution along surface 14 caused by the friction created between the molecules in fluid 2 and the molecules in surface 14. In addition, as fluid 2 progresses across surface 14, the fluid begins to detach from surface 14. This detachment of fluid 2 from surface 14 is commonly referred to as separation. Friction leads to separation and separation leads to an increase in turbulence of fluid flow. Thus, FIG. 3-A illustrates an unmodified surface 14, wherein it can be seen that a significant amount of initial pressure drag 42, friction drag 46, and final pressure drag 54 exists, each of which will cause fluid 2 to separate and exhibit a greater amount of turbulence across surface 14.

FIG. 3-B illustrates the same object 12 shown in FIG. 3-A, only FIG. 3-B illustrates object 12 as having a fluid flow regulator 10 incorporated therein. As can be seen, fluid flow regulator 10, and particularly pressure recovery drop 26, is placed at the precise point at which separation of fluid 2 begins. This location is described herein as optimal pressure recovery point 34 and represents the point at which pressure is recovered via fluid flow regulator 10. Drop face 30 comprises a height capable of inducing pressure recovery at optimal pressure recovery point 34. As can be seen from FIG. 3-B, fluid begins to separate from surface 14 as it progresses along surface 14. This separation is illustrated by the arrows extending up from surface 14 at optimal pressure recovery point 34. It is at this point that fluid flow regulator is placed and the point at which pressure recovery drop 26 induces a sudden pressure drop, thus functioning as a pressure recovery mechanism. By incorporating a fluid flow regulator 10 into object 12, and particularly surface 14, several effects result, including the lowering or reducing of pressure drag 42 located at the front 16 of object 12, friction drag 46 located along surface 14, and pressure drag 50 located at the end of object 12. Each of these is illustrated in FIG. 3-C where it is shown that pressure drag 42, friction drag 46, and pressure drag 50 are all significantly reduced, thus signaling powerful pressure recovery capabilities of fluid flow regulator 10. Moreover, it can be seen that pressure drag 42 and pressure drag 50 are more equal than the same pressure drags found on object 12 of FIG. 3-A. Equalization of these two opposing pressure drags is a direct result of the pressure recovery that takes place at the location of fluid flow regulator 10.

From this it can be seen that fluid flow regulator 10 significantly influences the behavior of the fluid over surface 14. This effect may lead to significant design changes in both form and function of fluid-exposed surfaces and objects.

Depending upon the length of the surface or any other design considerations, it may be necessary to employ multiple fluid flow regulators. For example, if a surface is long and fluid flow over that surface is required to travel a substantial distance the fluid may once again begin to separate from the surface after passing the first fluid flow regulator. As such, this subsequent point of separation may be considered a second optimal pressure recovery point and may necessitate the addition of a second fluid flow regulator. In essence, multiple fluid flow regulators may be utilized to carry out the intended function of recovering pressure and increasing the laminar flow of the fluid over the entire surface and the present invention contemplates these.

FIG. 4 illustrates an embodiment comprising object 12 having first fluid flow regulator 10 and second fluid flow regulator 110 integrally formed within its surface 14. First and second fluid flow regulators 10 and 110 function similarly, only second fluid flow regulator 110 is located at a second optimal pressure recovery point 134 and comprises leading edge 118 leading into pressure recovery drop 126, and trailing edge 122 extending away from pressure recovery drop 126. Second optimal pressure recovery point 134 exists at the point at which fluid 2 begins to separate once again from surface 14 following its passing over first fluid flow regulator 10. Thus, once fluid 2 begins to separate again, it encounters second fluid flow regulator 110, which induces a sudden pressure drop at pressure recovery drop 126, which in turn creates second sub-atmospheric barrier 138 over which fluid 2 passes in an increased laminar state. As such, multiple fluid flow regulators function to maintain the laminar flow characteristics of fluid 2 over the entire length of surface 14. As stated, a plurality of fluid flow regulators may be utilized as necessary.

In one exemplary embodiment, fluid flow regulator 10 is integrally formed with and part of surface 14. As such, leading edge 18, pressure recovery drop 26, and trailing edge 22 are integrally formed with and part of surface 14. This arrangement represents the embodiments illustrated in FIGS. 1-4. Moreover, fluid flow regulator 10 preferably spans the length or width of surface 14, but may also be designed to extend only a limited distance across surface 14.

Figure 5:
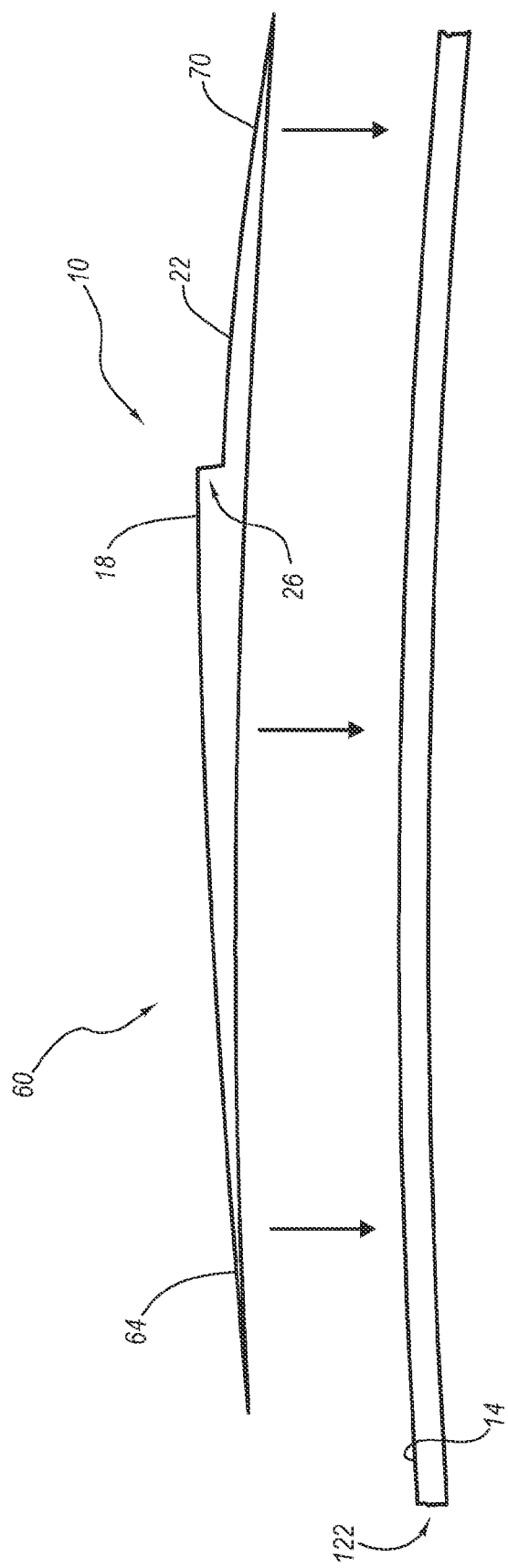
FIG. 5 illustrates a side cross-sectional view of a removable or detachable fluid flow regulator device capable of attaching or adhering to a surface to provide one or more fluid flow regulators thereon.

In another exemplary embodiment, illustrated in FIG. 5, fluid flow regulator 10 may comprise a separate fluid control device 60 that removably attaches to an existing surface 14. Fluid control device 60 comprises one or more fluid flow regulators 10 that function as described herein. FIG. 5 illustrates fluid control device 60 as comprising an transition extension 64 that, when attached to surface 14, provides a smooth transition for fluid 2 as it travels across surface 14 onto fluid control device 60. Transition extension 64 comprises a gradual slope that extends up to and connects to leading edge 18. Leading edge 18 then transitions into pressure recovery drop 26 as discussed above. Fluid control device 60 further comprises a trailing edge 22 that transitions with another transition extension 70 that once again slopes downward toward surface 14 to provide a smooth transition for fluid 2 from fluid control device 60 to surface 14. Of course, it a transition from surface 14 to fluid control device 60 is unnecessary, fluid control device can be made to completely cover surface 14 so that fluid control device 60 becomes the surface of object 12. Either way, fluid control device 60 attaches to an existing surface 14 and essentially functions as a quasi surface over which fluid 2 flows. Fluid control device 60 may be attached to surface 14 using various attachment means, including adhesives, screws, snaps, hook and loop fastener, etc. Fluid control device 60 may also attach to surface 14 using some type of connection or joint, such as a slot or groove arrangement.

In addition to the contemplation of multiple fluid flow regulators, the present invention further contemplates differing heights between one or more fluid flow regulators along the same surface. Again referring to FIG. 4, second pressure recovery drop 126 may have a drop face 130 that comprises a different height than first pressure recovery drop 26 and associated drop face 30. As indicated above, the pressure gradients existing along a surface are different in degree or magnitudes. The degrees or magnitudes of these pressure gradients are also not static, but vary and fluctuate through a range during the time the fluid is flowing over the surface of the object, according to and as a result of several known factors. To account for these varying and changing or fluctuating pressure gradients, the height of each drop face on each pressure recovery drop can be designed to effectively recovery the most pressure. The height of each drop face will largely be dependent upon the amount of pressure recovery needed at a particular pressure gradient to achieve optimal fluid flow over the surface at that particular location and instance. In one embodiment, subsequent pressure recovery drops will most likely comprise shorter drop faces than their preceding counterparts as much of the pressure recovery in the fluid will be recovered by the initial pressure recovery drop. Therefore, a less drastic reduction in pressure or less pressure recovery will be required at subsequent pressure recovery drops to continue or maintain the optimal fluid flow. Or, the pressure gradient across the surface will be controlled by successive fluid flow regulators having different heights so that pressure, and therefore separation, is kept to a minimum, or within acceptable or desired levels.

Figure 6:
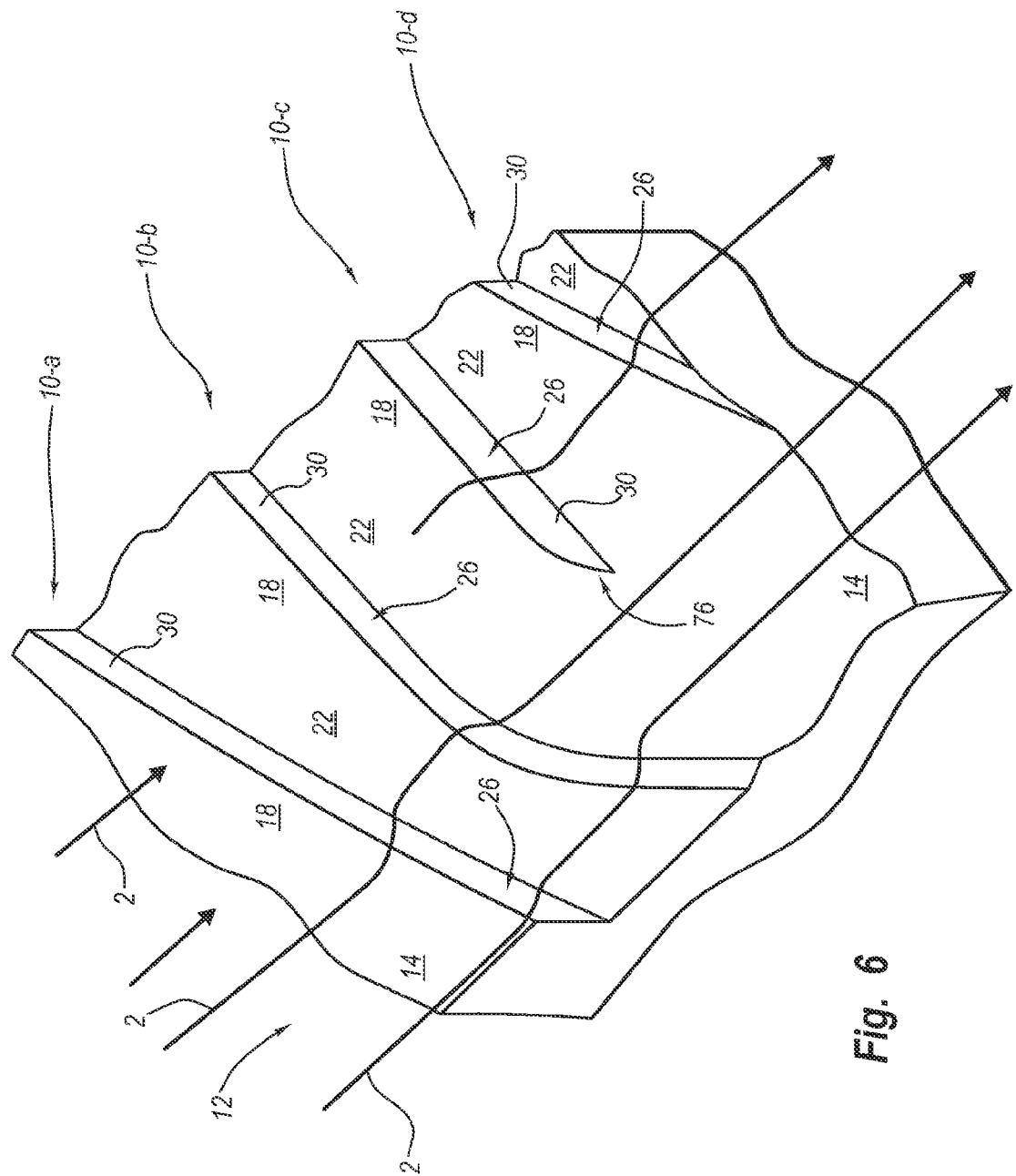
FIG. 6 illustrates an isometric cut away view of a surface having a plurality of fluid flow regulators thereon arranged in several different orientations with respect to fluid flow.

The present invention also contemplates that one or more fluid flow regulator(s) may comprise different orientation arrangements along a single surface of an object, or that a fluid flow regulator may be arranged at any angle to fluid flow, although perpendicular or substantially perpendicular is preferred, depending largely upon the direction of fluid flow, the shape of the object, the function of the object, the type of fluid, and any others recognized by one of ordinary skill in the art. Referring now to FIG. 6, shown is object 12 comprising a surface 14, wherein surface 14 comprises a plurality of fluid flow regulators 10 thereon, shown as fluid flow regulators 10-*a*, 10-*b*, 10-*c*, and 10-*d*, each comprising a leading edge 18, a trailing edge 22, a pressure recovery drop 26, and a drop face 30. As can be seen, one or more fluid flow regulators 10 may be placed on a single surface 14, as desired. In addition, fluid flow regulators 10 may comprise any size, length, shape, curvature, etc. Still further, fluid flow regulators 10 may comprise different drop face heights. And, still further, fluid flow regulators 10 may be arranged or oriented as required or desired to induce and maintain optimal fluid flow across surface 14. Typical orientations include fluid flow regulators that are perpendicular to fluid flow, that are on acute angles to fluid flow, that comprise one or more curved segments, etc. The foregoing is evident by fluid flow regulator 10-*a* comprising a linear design, yet is on an acute angle with respect to the direction of flow of fluid 2. Fluid flow regulator 10-*b* comprises a linear segment that transitions into a curved segment. Fluid flow regulator 10-*c* comprises a limited length that further comprises a blended end 76 that gradually blends into surface 14. Fluid flow regulator 10-*d* comprises a linear design similar to fluid flow regulator 10-*a*, but further comprises shorter or lower profile drop face 30. FIG. 6 illustrates several possible configurations, namely sizes, shapes, and orientations, that fluid flow regulators may comprise over a single surface. However, these are not meant to be limiting in any way. Indeed, engineering design parameters, environmental conditions, and other factors will lead one ordinarily skilled in the fluid dynamics art to conclude or recognize other potential configurations. The present invention, although impossible to recite, contemplates each of these and each is intended to fall within the scope of the description and claims presented herein.

Fluid flow regulators may be integrally formed within the surface of an object, or attached via a removable attachment device, as discussed above. Essentially, no matter how fluid flow regulators are related to or incorporated into the surface of an object, either integrally formed, part of a removable device, cut-out of the surface, etc., the term "featured" as used herein and in the claims is meant to cover each of these.

In another embodiment, fluid flow regulators may comprise a mechanism or system comprising individually operating, yet interrelated component parts that function to provide or create one or more fluid flow regulators in a surface, wherein the fluid flow regulators are dynamically adjusted or adjustable. Because an object in fluid flow experiences a number of different and changing or varying influencing forces or environmental conditions that result in varying surface and fluid flow characteristics, such as pressure gradients along or across its surface, it follows that an adjusting or adjustable fluid flow regulator would be advantageous to maintain optimal fluid flow during the entire time the object is experiencing fluid flow over its surface and to account for these varying or changing conditions, thus allowing the fluid to achieve its greatest flow potential across the surface of the object. Thus, the present invention features a dynamic or adjustable fluid flow regulator capable of altering its physical characteristics, location, and/or existence altogether, as well as compensating for varying fluid flow conditions. Any of the component parts of the fluid flow regulator may be designed to move or adjust to vary the height of drop face and pressure recovery drop, such as designing the leading edge, the pressure recovery drop, and/or the trailing edge to comprise the ability to adjust to vary the height of pressure recovery drop. In addition, the surface or object may comprise one or more elements or components that are utilized in conjunction with the fluid flow regulator to vary the height of the drop face. In essence, the present invention contemplates any device, system, etc. that is capable of adjusting the pressure recovery drop on demand an in response to varying situations or conditions. The dynamic fluid flow regulator may be mechanically actuated, or designed to oscillate in response to changing conditions.

In addition, the present invention contemplates the ability for dynamic fluid flow regulator to the vary pressure recovery drop, and particularly the height of the drop face therein, either consistently along the length of the pressure recovery drop, wherein the drop face would comprise the same height along its entire length, or inconsistently along the length of the pressure recovery drop, wherein the drop face would comprise different heights along the its length. This would account for velocity and pressure differentials across the surface of the object at the location of the fluid flow regulator.

With reference to FIG. 7-A, shown is one exemplary embodiment of a dynamic fluid flow regulator. Specifically, object 12 is shown comprising a surface 14 having a recess 80-*a* and a recess 80-*b*, each created in surface 14. Recess 80-*a* comprises a cut-away portion of object 12, such that pressure recovery drop 26, and particularly drop face 30 is created therein. Recess 80 specifically comprises a horizontal 'surface 14-*a* that is integrally formed with and part of surface 14 of object 12, and a vertical surface 30-*a* that functions as pressure recovery drop 26 and drop face 30. Recess 80-*b* comprises a cut-away portion of object 12, such that pressure recovery drop 26, and particularly drop face 30 is created therein. Recess 80 specifically comprises a horizontal surface 14-*b* that is integrally formed with and part of surface 14 of object 12, and a vertical surface 30-*b* that functions as pressure recovery drop 26 and drop face 30. To create dynamic fluid flow regulator 10, rotatably attached to object 12 at a distal location from drop face 30, using one or more attachment means, is an adjustable plane 82. Adjustable plane 82 comprises a surface that closely fits and interacts with pressure recovery drop 26, and that adjusts on demand to vary the height of drop face 30. Thus, variations in pressure drag, friction drag, velocity, fluid viscosity and other factors or conditions that occur and develop as fluid 2 flows over object 12 can be monitored and compensated for simply by actuating adjustable plane 82, which subsequently alters the height of drop face 30 and pressure recovery drop 26, as needed. Monitoring devices common in the industry may be used to monitor the conditions and characteristics of both the fluid flow and the object.

Dynamic fluid flow regulator 10, and particularly adjustable plane 82, may also be designed to comprise transverse movement that allows adjustable plane 82 to move bi-directionally in a horizontal manner to preserve a tight relationship between end 86 and drop face 30 and to ensure drop face 30 is perpendicular to surface 14. In addition, end 86 preferably seals tightly against drop face 30 at all times and at all vertical positions.

Moreover, the present invention fluid flow regulator(s) may be designed so that the position or location of the fluid flow regulators altogether may be selectively altered. This embodiment is contemplated because the optimal pressure recovery point(s) along a surface may not always be in the same location. For example, faster fluid velocities, different altitudes, varying pressures, and other forces, may cause optimal pressure recovery points to vary along the surface. As such, the dynamic fluid flow regulators may be designed to comprise the ability to undergo selective vector movement, meaning that they may be moved or repositioned in any direction along the surface to once again be in alignment with an optimal pressure recovery point.

In operation, dynamic fluid flow regulator 10 functions to regulate varying pressure gradients across surface 14 by continuously altering the potential pressure recovery at one or more optimal pressure recovery points 34. Continuously altering the potential pressure recovery involves monitoring the pressure gradients acting upon the surface to determine whether these pressure gradients are strong enough to induce separation of the fluid from the boundary layer created along surface 14 from the flow of fluid. Monitoring devices and/or systems commonly known in the art for monitoring pressure and friction drag and fluid separation would be able to indicate whether there was a need for actuation of dynamic fluid flow regulator 10 to recover pressure and maintain the attachment of the fluid in a laminar, optimal flow at that point or location on surface 14. As fluid flows over surface 14, dynamic fluid flow regulators 10 would be placed at those locations most likely to experience separation. However, often pressure gradients along a surface exhibit significant pressure differentials. Utilizing dynamic fluid flow regulator provides the means for compensating for these differentials. For instance, in a controlled environment, if a fluid is flowing over a surface at a constant rate, the flow is easily predicted and the determination of the number, placement, and design of fluid flow regulators is simple. However, as conditions change, either with respect to the fluid or the object, it may become necessary to modify or change the design, placement, or number of fluid flow regulators to compensate for the change and maintain separation and optimal fluid flow. This is even more true in an uncontrolled, natural environment. As such, dynamic fluid flow regulators serve such a purpose. For a set of given conditions, adjusting plane 82 may be set so that pressure recovery drop 26 comprises a pre-identified drop face height. This height is calculate to provide the necessary amount of pressure recovery at that point to prevent separation and maintain laminar fluid flow. As conditions change, adjusting plane 82 may be adjusted up or down as indicated by the arrows to increase or decrease the height of drop face 30. Adjusting plane 82 is adjusted by rotating attachment means 84 connecting adjusting plane 82 to object 12. Thus, if the pressure drag and friction drag at that point increase, separation may result if pressure recovery drop 26 is fixed at its original position. To overcome separation and maintain optimal fluid flow, adjusting plane 82 is actuated to lower, and therefore, increase the distance or height of drop face 30, which has the effect of creating a greater drop in pressure leading to increased pressure recovery. The degree adjusting plane 82 is adjusted is a calculated determination. to be made considering all known and relevant factors.

Adjusting plane 82 may also move horizontally back and forth as needed. Horizontal movement may be necessary to keep the travel of end 86 as linear as possible, and as close to drop face 30 as possible, especially if the distance adjusting plane 82 is required to travel is substantial. If adjusting plane 82 is not allowed to move horizontally, end 86 would travel along an arc and would separate from drop face 30 at some point, thus frustrating the intended function and effects of fluid flow regulator 10.

FIG. 7-B illustrates another exemplary embodiment of a dynamic fluid flow regulator. In this embodiment, dynamic fluid flow regulator 10 also comprises an adjusting plane 90. However, in this embodiment, adjusting plane 90 moves vertically up and down as needed to adjust pressure recovery drop 26 and drop face 30. Adjusting plane 90 is caused to move up and down by actuating one or more lifts 98. Although the mechanism illustrated in FIG. 7-B is different than that shown in FIG. 7-A, the function and effect is the same. Essentially, pressure recovery drop 26 and drop face 30 is allowed to increase or decrease in response to changing or varying fluid flow conditions for the purpose of inducing the proper amount of pressure recovery along surface 14 to ensure optimal fluid flow.

Although not illustrated, the present invention further features a fluid flow regulator that may be adjustably or selectively positioned along surface 14. Often during fluid flow, due to many contributing factors, the point along surface 14 at which separation begins will vary in location. As such, it becomes necessary to be able to identify each of these optimal pressure recovery points 34 and to place a fluid flow regulator at that point. Allowing fluid flow regulators to be selectively positioned along surface 14 greatly increases the potential for proper and optimal pressure recovery and for reducing flow separation.

It should be noted that the present invention contemplates any type of system, device, etc. that is capable of adjusting or modifying the design characteristics of fluid flow regulators to regulate the pressure gradients across a surface. Although in the preferred embodiments recited herein these modifications are facilitated by providing one or more dynamic fluid flow separators, these embodiments are only exemplary and not intended to be limiting in any way. Indeed, one ordinarily skilled in the art will recognize other designs that carry out the intended function of the present invention.

The present invention fluid flow regulators, and the surfaces on which these are utilized, offer many significant advantages over prior art surfaces and fluid flow regulating devices or systems. Although several advantages are specifically recited and set forth herein, fluid dynamics is an extremely broad field with many properties still largely misunderstood or unknown, thus making it impossible to identify, describe, and feature all of the possible effects and advantages of the present invention. As such, the intention of the present application is to provide an initial starting point for many extensive and ongoing experiments and studies by all interested. As such, the present invention provides several significant advantages.

First, the fluid flow regulators provide the ability to induce pressure drops on demand. These pressure drops allow the fluid flow regulators to regulate pressure gradients about the surfaces of the objects or bodies on which they are applied. This is significant because the ability to regulate pressure gradients provides the ability to influence, control, and optimize fluid flow about the surface and to reduce the separation and/or separation potential of the fluid. Moreover, the ability to regulate pressure gradients is provided on an as needed basis, meaning that the magnitude of pressure recovery induced can be controlled by varying the physical location and characteristics of the fluid flow regulators.

Second, the fluid flow regulators provide increased and less volatile molecule interaction between the molecules in the fluid and the molecules in the surface. This is largely accomplished by the generation of a sub-atmospheric barrier of low pressure that acts as a cushion between each of these molecules. As such, the boundary layer between the surface and the most adjacent or proximate fluid flow stream is preserved even in stressful or high pressure drag situations.

Third, flow separation is essentially eliminated across the surface of any surface. At each precise point along a surface where flow begins to separate, a fluid flow regulator is placed, thus functioning to induce a sudden pressure drop at that point. This sudden drop in pressure performs the necessary influence on pressure drag and friction drag to effectuate the most appropriate pressure recovery that forces the fluid to remain attached to the surface, and to maintain an optimal flow pattern.

Fourth, fluid flow regulators provide the ability to significantly influence pressure drag by reducing pressure drag at various locations along the surface. Reducing the pressure drag in turn increases pressure recovery, which subsequently lowers the friction drag along the surface. By reducing or lowering friction drag, the potential for fluid separation is decreased, or in other words, attachment potential of the fluid is significantly increased.

Fifth, pressure drag forward and aft a surface is reduced. Moreover, these pressure drags are more likely to be equalized, or these pressure drags are more likely to achieve a state of equilibrium at a much quicker rate.

Sixth, dynamic fluid flow regulators provide the ability to, compensate for changing or varying conditions, either environmental, within the flow, or within the object itself, by facilitating the most accurate and strategic pressure drops possible across the surface.

Seventh, the potential and kinetic energy of molecules is more efficiently utilized and accounted for.

Eighth, a surface featuring one or more fluid flow regulators functions to improve the overall efficiency of the object or body or craft on which it is being utilized. By influencing the flow to obtain the most optimal flow state, the object is required to output less power than a similar body or object comprising a streamlined surface makeup.

Ninth, fluid flow regulators significantly reduce noise produced by fluid flowing across the surface of the object. Noise is reduced due to the flow properties being made optimal as compared to streamlined surfaces. Noise reduction can be a significant problem in many fields and applications, such as in the design and operation of jet engines.

These advantages are not meant to be limiting in any way as one ordinarily skilled in the art will recognize other advantages and benefits not specifically recited herein.

Fluid flow regulator 10 may be applied to or formed with any type of surface or object subject to external fluid flow. For example, some common objects that have surfaces subject to external fluid flow comprise airplanes or aircraft (wings and fuselages), rockets, automobiles, spoilers, boats and ships and other watercraft, motorcycles, helmets, propellers, turbines, impellers, rotors, fans, blowers, diffusers, and many others. In addition, fluid flow regulators may be applied to or formed with any type of surface subject to internal fluid flow, such as nozzles, pumps, venturies, and others. It is impossible to recite and describe the numerous possible designs and applications to which the present invention may be present within or applied to. As such, it is contemplated that the present invention will be applicable to any surface subject to fluid flow, whether the object itself is designed to be in motion or whether it is designed to be stationary.

It should also be recognized that the particular design, number, and orientation of the fluid flow regulators is dependent upon the physical limitations or constraints of the object, the performance characteristics of the object, as well as the intended conditions or environment in which the object will operate. Other factors may also be considered as will be recognized by one ordinarily skilled in the art.

The present invention further features a method for influencing external fluid flow over the surface of an object and for influencing the rate and magnitude of pressure recovery along the surface. This method comprises the steps of: featuring at least one fluid flow regulator with one or more surfaces of an object, wherein the fluid flow regulator comprises a pressure recovery drop having at least one drop face formed therein, and wherein the drop face comprises a calculated height; subjecting the object to a fluid, such that the fluid is caused to move about the object; and causing the fluid to encounter the fluid flow regulator, such that the pressure recovery drop induces a sudden drop in pressure as the fluid flows over the fluid flow regulator, wherein a sub-atmospheric barrier is created at the base of the drop face. As such, the fluid flow regulator functions to optimize fluid flow about the object, thus increasing the performance of the object in the fluid.

The present invention further features a method for controlling the flow of fluid across an object's surface. The method comprises the steps of: obtaining an object subject to fluid flow, the object having one or more fluid bearing surfaces over which a fluid may flow; featuring one or more fluid flow regulators as part of the fluid bearing surfaces, wherein the fluid flow regulator optimizes fluid flow and the performance of the object in the fluid; subjecting the object to the fluid; and causing the fluid to flow about the object so that the fluid encounters the one or more fluid flow regulators.

It should be noted that the foregoing methods incorporate all of the features, functions, elements, and advantages discussed above and herein.

Moreover, the present invention features a fluid control system comprising an object having at least one surface subjected to a fluid, such that the fluid flows about the object; and a fluid flow regulator featured and operable with the surface, wherein the fluid flow regulator comprises the elements and functions as described herein.

Although the present invention is applicable to any solid body object having a surface over which fluid passes, the present invention focuses on two primary devices or applications, namely wings or wing structures and aircraft flight, and diffusers and their many applications. Each of these is discussed individually below.

WING AND WING STRUCTURES COMPRISING A FLUID FLOW REGULATING SYSTEM AND METHOD

One advantageous application of the present invention fluid flow regulators relates to the design and performance of wings and wing structures. Although this area has received extensive study and analysis, the present invention furthers wing development and technology by providing a fluid flow regulating system and method that drastically improves the performance of wings of any size, shape, or design.

Figure 8:
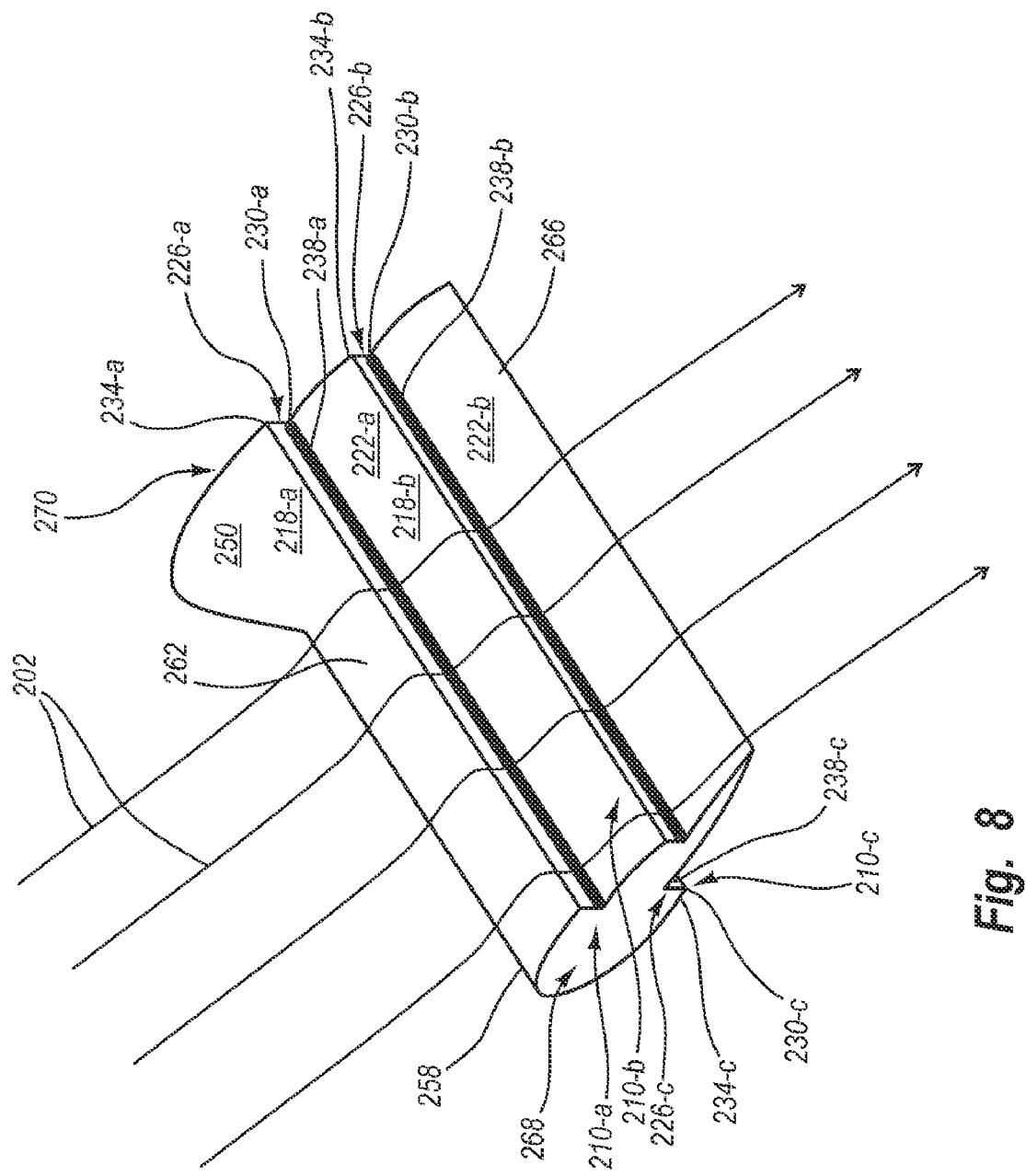
FIG. 8 illustrates an isometric view of an airplane wing having one or more fluid flow regulators formed in the upper and lower surfaces of the wing.

With reference to FIG. 8, illustrated is an isometric view of a cross-section of one particular design of a wing, shown as wing 200. Wing 200 comprises an upper surface 250, a lower surface 254 (not shown), a front or forward surface 258, a leading edge 262, a trailing edge 266, a wing tip, 268 and a wing root 270 that attaches to a fuselage of an airplane. Wing 200 further comprises a first fluid flow regulator 210-a and a second fluid flow regulator 210-b longitudinally oriented perpendicular or substantially perpendicular to flow of air 202 (indicated by the arrow) along upper surface 250. FIG. 8 also illustrates fluid flow regulator 210-c existing and positioned on lower surface 254. Fluid flow regulator 210-c is also longitudinally oriented along lower surface 254 and is perpendicular or substantially perpendicular to air 202.

First fluid flow regulator 210-a is positioned upstream or forward second fluid flow regulator 210-b and is the first of the two to encounter air flow 202. Each of these function to influence fluid flow and regulate the pressure gradients existing along upper surface 250. Fluid flow regulator 210-c functions in a similar manner, only for or along lower surface 254. Fluid flow regulator 210-a comprises the elements discussed above, which are shown herein, namely leading edge 218-a, trailing edge 222-a, pressure recovery drop 226-a, drop face 230-a, and optimal pressure recovery point 234-a. Fluid flow regulators 210-b and 210-c also comprise similar elements, with like elements marked with like numbers as indicated (elements 210-*b* to 234-*b* for fluid flow regulator 210-*b*; and elements 210-*c* to 234-*c* for fluid flow regulator 234-*c*).

FIGS. 9-A and 9-B are cross-sectional illustrations of two different exemplary wing structure embodiments comprising or utilizing one or more fluid flow regulators 210. FIG. 9-A illustrates wing 200 as comprising a plurality of fluid flow regulators, namely fluid flow regulators 210-*a*, 210-*b*, 210-*c*, 210-*d*, 210-*e* situated on upper surface 250, and fluid flow regulator 210-*f* situated on lower surface 254. FIG. 9-B illustrates wing 200 as also comprising a plurality of fluid flow regulators, namely fluid flow regulators 210-*a* and 210-*b* situated on upper surface 250, and fluid flow regulator 210-*c* situated on lower surface 254, only these are arranged in a different configuration than those on wing 200 in FIG. 9-A. Fluid flow regulators 210 (illustrated generally as 210) are preferably positioned at or as close to the point of fluid separation as possible. FIGS. 9-A and 9-B simply serve to illustrate that different wings or wing structures will require a different number of fluid flow regulators, or fluid flow regulators positioned at different locations about the wing. As such, the present invention contemplates each of these different configurations and designs. One ordinarily skilled in the art of fluid dynamics over a wing surface will be able to calculate precisely the number, location, and orientation of fluid flow regulators to be utilized in a given situation.

Referring back to FIG. 8, as air 202 encounters wing 200, and particularly frontal surface 258, it subsequently passes over upper surface 250 and lower surface 254 in which the stability or equilibrium or otherwise current state of the air is disrupted, or rather the molecules in air 202 are disturbed. In addition, as pointed out above, various aerodynamic forces are generated between air 202 and wing 200. In effect each of fluid flow regulators 210-*a*, 210-*b*, and 210-*c* function to influence these forces for the purpose of optimizing the flow of air 202 over wing 200 and for restoring a state or equilibrium to air 202 as quickly as possible as it leaves wing 200.

Specifically, as wing 200 begins to move through air 2, the air molecules tend to stick or adhere to upper surface 250 and lower surface 254, thus creating either a turbulent or laminar air boundary layer. In addition, drag forces are at work, namely pressure drag and friction drag. Pressure drag induces a number of pressure gradients about wing 200, which are factors in analyzing lift. As the wing accelerates through air 202 and the velocity of air about wing 200 increases, the pressure drag on both upper and lower surfaces 250 and 254 increases, as does the magnitude of the pressure gradients. In addition, because air is less dense than other fluids, such as water, or is less viscous, the potential for fluid separation is increased, especially in light of the high velocities encountered by a wing during air flight.

Prior art wings are typically streamlined, meaning that their surfaces are smooth and uniform. This has led experts to be able to predict the response of the wing in the air, as well as the behavior of the air itself. However, several problems exist with streamlined designs, evidenced by the several phenomenon that are still largely misunderstood. By providing a wing surface having one or more fluid flow regulators, it is believed that several of the problems encountered with streamlined wings are reduced, minimized, or even eliminated.

As shown, in FIG. 8, fluid flow regulators 210 are placed at precise optimal pressure recovery points 234, which are predetermined to be located at the point in which air and air flow separation begins. The location of these points are calculated based upon wing structure, intended use of the aircraft, speed of flight, and others known to those skilled in the art. The precise location of these points is not specifically recited herein as several factors go into determining these, and as they will be different from wing to wing and from aircraft to aircraft. In addition, these points may vary for a single wing structure during the course of flight.

Unlike prior art streamlined wings, the present invention fluid flow regulators function to regulate, or are capable of regulating, the pressure gradients induced about wing 200 by facilitating pressure recovery precisely at these optimal pressure recovery points 230. Indeed, pressure recovery is increased as air 202 moves over or encounters fluid flow regulator 210. Specifically, as air 202 encounters fluid flow regulator 210-*a* positioned at first optimal pressure recovery point 234-*a*, there is a sudden and significant drop in pressure as the air 202 suddenly and instantly encounters a drop in surface 250 and 254. As such, air 202 literally falls off of pressure recovery drop 226-*a*, and particularly drop face 230-*a*. This sudden drop in pressure and the continued flow of air 202 causes a sub-atmospheric barrier or shield 238-*a* to be generated, which is essentially a low pressure air cushion that acts as a barrier between the molecules in the boundary layer of fluid 2 and surface 250 or 254.

Fluid flow regulator 210-*a* further functions to reduce pressure drag as a result of the sudden pressure drop induced at pressure recovery drop 226-*a*. By reducing pressure drag, pressure recovery is increased. FIGS. 10-A illustrates a prior art streamlined wing 280, and FIG. 10-B illustrates a wing 200, each at positive lift. Wing 200 in FIG. 10-B comprises a plurality of fluid flow regulators 210 incorporated therein. As can be seen, the pressure drag on upper surface 284, lower surface 288, frontal surface 292, and tail end 296 of wing 280 illustrated in FIG. 10-A is much greater than the pressure drag on the similar elements of wing 200 of FIG. 10-B. In addition, with reference to FIG. 10-A, pressure drag 300 on wing 280 located at frontal surface 292 comprises a much greater magnitude than pressure drag 308 at tail end 296. This shows the imbalanced state of the airflow from the front of wing 280 to the rear of wing 280, which imbalance induces turbulent wing tip vortices as air 202 leaves the surface. Conversely, with reference to FIG. 10-B, pressure drag 316 on wing 200 located at frontal surface 258 comprises a similar magnitude as pressure drag 324 at tail end 266. This shows that fluid flow regulators 210 help to equalize the air flow 202 from the front of wing 200 to the rear of wing 200, which greater state of equilibrium significantly reduces the potential for and the magnitude of wing tip vortices.

The reduction in pressure drag discussed above, is a direct result of the sudden, induced pressure drop and sub-atmospheric barrier created at each pressure recovery drop of each fluid flow regulator 210, and leads to an increase in pressure recovery along the surface. An increase in pressure recovery means that the fluid about the wing structure is closer to a state of equilibrium.

Referring again back to FIG. 8, an increase in pressure recovery has the effect of increasing the equilibrium potential of the air flow, which therefore reduces the friction drag about wing 200. This is true because air molecules do not adhere or stick to other air molecules as easily as they stick to the surface molecules of wing 200. Instead, the air molecules essentially glide or slide over sub-atmospheric barrier 238-*a* with almost no disruption or turbulence, much the same way they did when equalized just prior to their encounter with wing 200. And, since there is little pressure drag and little friction drag, two primary contributors of laminar separation, air flow separation (both laminar and turbulent) becomes much less of a problem than with streamlined wing structures. As such, traditional thinking that streamlined is better is likely to be frustrated.

By reducing friction drag and subsequently increasing the attachment potential of the air boundary layer, the air flow about wing 200 is remarkably less turbulent, more laminar, less prone to undesirable pressure gradients, and, among others, is more easily influenced, manipulated, and predicted. Each of these function to allow wing 200 to be much more efficient in flight and to comprise more efficient and useful designs than streamlined wings. As such, it can be said that air flow about a wing is optimized, or that a wing structure's performance can be significantly enhanced. And, since air flow about wing 200 is optimized, there will be less disruption in air 202 as it leaves wing 200, which will significantly decrease wing tip vortices. This effect of reducing wing tip vortices is discussed below.

As air 202 leaves first fluid flow regulator 210-a it comprises an improved laminar and all around optimal state. However, depending upon the length of wing 200 and the distance air 202 has to travel prior to leaving wing 200 altogether, the various aerodynamic forces at work and influenced by first fluid flow regulator 210-a may again come into play, thus again disrupting fluid 202 and frustrating its optimal flow. As such, wing 200 comprises a second fluid flow regulator 210-b, positioned at second optimal pressure recovery point 234-b, that functions similarly to first fluid flow regulator 210-a. However, second fluid flow regulator 210-b may comprise a different design configuration, such as a shorter drop face height, depending upon the properties and characteristics of the fluid at the time it reaches optimal pressure recovery point 234-b.

Fluid flow regulator 210-c is positioned along lower or bottom surface 254 and functions to regulate pressure gradients along surface 254 in a similar manner as fluid flow regulators 210-a and 210-b on upper surface 250. Each of the fluid flow regulators on upper surface 250 are directly related to the fluid flow regulators on lower surface 254, such that when designing wing 200, each will be a significant factor in the design of the other. This becomes evident when one considers the fact that pressure gradients are generated on each of upper and lower surfaces 250 and 254, and that these pressure gradients control or dictate the lift characteristics of wing 200. Thus, it can be said that regulating these pressure gradients via one or more fluid flow regulators as taught herein also functions to influence and regulate lift.

Lift is a commonly referred to principle of aerodynamics and essentially is a force acting perpendicular to the direction of flight. Lift is equal to the fluid density multiplied by the circulation about the airfoil and the free stream velocity. Lift can also be described as the upward force created by the airflow as it passes over the wings. This force is the key aerodynamic force, and is opposite the weight force. In straight-and-level un-accelerated flight, an aircraft is in a state of equilibrium. The lifting force is equal to the weight of the aircraft, therefore the aircraft does not climb or dive. If the lifting force were greater than the weight, then the aircraft would climb. If the aircraft were to loose some of it's lift, it would continue to climb unless the weight of the aircraft was more than the lifting force. In this instance, the aircraft would begin to descend back to earth. Lift is generated according to the Bernoulli Principle, which describes the existing principle of pressure differential that is occurring across the wing structure. Simply stated, as the velocity of a fluid increases, its internal pressure decreases. A fluid flow that is traveling faster will have a smaller pressure, according to Bernoulli. Airplane wings are shaped to take advantage of this principle. The designed curvature on top of the wing causes the airflow on top of the wing to accelerate. This acceleration leads to a higher velocity air on top of the wing than on bottom, hence a lower pressure area on top of the wing than on bottom. The resulting pressure differential between the two wing surfaces is actually the phenomenon that induces the upward force called lift.

The present invention allows an even greater increase in the velocity of the fluid and a resulting decrease in the pressure across the surface of a wing with identical power input into the aircraft. Stated another way, the present invention creates a more efficient wing and aircraft in that less power is required to achieve the same amount of lift if the wings of the aircraft employ one or more fluid flow regulators.

Related to lift is the principle or concept of angle of attack or angle of incidence. Angle of attack may briefly be defined as the angle formed by the longitudinal axis of the aircraft with respect to the chord of the wing. When analyzing the flow of fluid over an airfoil, namely a wing, the aerodynamic forces of pressure drag and friction drag are factors of considerable importance, and factors that are considered when analyzing and determining wing performance at various angles of attack. At relatively small or low profile angles of attack, the boundary layers on the top and bottom surfaces of the wing experience only mild pressure gradients, and they remain attached along almost the entire length of the chord. The vortices that form or that are generated as the wing passes through the surface at these angles are much less volatile and are of a much less magnitude than those generated at higher or larger angles of attack. In addition, the drag experienced is primarily due to friction drag rather than pressure drag (viscous friction inside the boundary layer). On the other hand, as the angle of attack is increased, the pressure gradients on the surfaces of the wing increase in magnitude, thus decreasing the attachment potential of the fluid (or increasing the separation potential of the fluid and the boundary layer). Any separation in the fluid will result in an increase in turbulence, an increase in pressure loss, and an increase in the volatility of the vortices coming off of the wing. As such, the magnitude of the pressure drag increases and the flow is less than optimal. At high angles of attack, the separation potential of the fluid is increased over the top surface of the wing, therefore scaling the inefficiency of the wing as the angel of attack increases.

The present invention further functions to regulate these pressure gradients at various angles of attack, therefore increasing the efficiency of the wing. Stated differently, incorporating one or more fluid flow regulators on a wing or wing structure significantly improves fluid flow over that surface and at all angles of attack versus the same fluid flow over a streamlined wing at the same angles of attack. As such, wings incorporating the fluid flow regulators of the present invention provide significant advantages over prior art wings by first, providing improved flow and overall efficiency at given angles of attack, and second, by being able to significantly increase the angle of attack known as the stall angle of attack.

With reference to FIGS. 11-A and 11-B, illustrated is wing 200 comprising two different angles of attack 350, shown at angles $\theta_1$ and $\theta_2$, respectively. As can be seen, the pressure drag 354 on wing 200 at angle $\theta_1$ in FIG. 11-A is not much less than the pressure drag 354 on wing 200 at the increased angle $\theta_2$ in FIG. 11-B. The marginal difference in pressure drag is due to the optimal fluid flow created over surface 250, as well as to the fact that fluid flow regulators operate to regulate pressure gradients along the surface of wing 200, thus being able to exert a greater influencing force upon the pressure gradients at a larger angle of attack than is required at a lower angle of attack. This variation in treatment may be accomplished using dynamic fluid flow regulators, as discussed in detail above, in which the pressure recovery drop may be altered or adjusted on demand, as needed.

Another significant advantage of the present invention fluid control system is found in an embodiment wherein the distance or height of the drop face of each fluid flow regulator 10 may be adjusted or is adjustable, either collectively at the same time and at the same distance or individually with each having differing heights. The fluid flow regulators 210 in FIGS. 11-A and 11-B may comprise a dynamic element that allows them to be adjustable. Providing adjustability in each fluid flow regulator 210 is advantageous because it is often critical or desirable to account for and accommodate various environmental conditions and factors, such as changing velocities, pressures, and densities of a fluid flowing over the surface of an object. These regulators may be adjusted by adjusting either the leading edge or the trailing edge, or a combination of these. Or, fluid flow regulators 210 may be adjusted using one or more types of mechanisms or systems that manipulate one or more component parts of fluid flow regulators 210. The adjustability feature becomes important when the wing undergoes varying changes in conditions resulting in different air flow parameters. For example, the speed and altitude of an aircraft are continually changing. Air flow should be able to be optimized at any speed or altitude, including very slow speeds and low altitudes to mach or supersonic speeds and high altitudes.

FIGS. 11-A and 11-B also illustrate pressure gradients along the bottom surface of wing 200 that also change according to the angle of attack, and that also may be regulated by one or more fluid flow regulators 210, as shown. Manipulation of pressure gradients along the bottom of wing 200 is made possible by the incorporation of one or more fluid flow regulators 210, similarly to manipulation of those pressure gradients existing on the upper surface of wing 200. As mentioned above, optimizing fluid flow and regulating pressure gradients along the surfaces of wing 200 using one or more fluid flow regulators allows wing 200 to experience greater angels of attack than would otherwise be possible.

Figure 12:
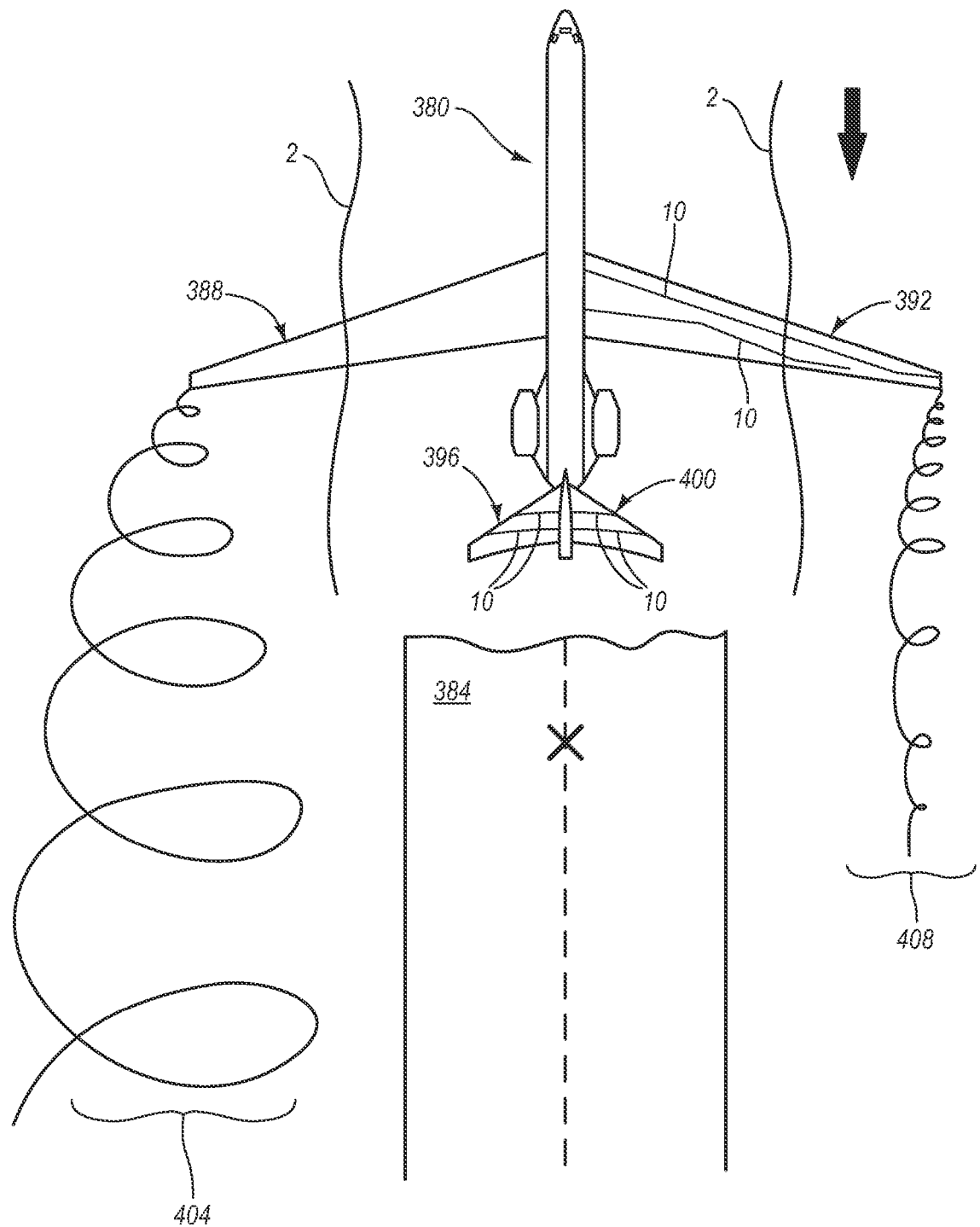
FIG. 12 illustrates a top view of an airplane just after takeoff and a comparison of the wing tip vortices created by the airplane, and particularly the streamlined wing and the wing comprising a plurality of fluid flow regulators FIG. 13-A illustrates an isometric view of one exemplary embodiment of a diffuser comprising or featuring a plurality of fluid flow regulators in each of its vanes.

FIG. 12 illustrates a top view of a jet airplane 380 just after takeoff from a runway 384. Specifically, FIG. 12 illustrates the difference in the generation and potential for wing tip vortices between a prior art streamlined wing 388 and a wing 392 comprising or incorporating one or more fluid flow regulators 10. Each of these designs generate wing tip vortices, but in much different magnitudes. Wing tip vortices are the result of high pressure air under the wings spilling around and over the wingtips to equalize the low pressure area above the upper wing surface, wherein the high pressure air is induced by wing tip air velocities and other forces. Wing tip vortices are common in the art during aircraft flight, especially during takeoff and landing, and numerous design and situational considerations have been impacted and implemented as a result of these. Moreover, experts have only been able to marginally reduce these vortices with various devices or systems, such as with boundary layer suction systems, and they remain a major consideration and impact on wing design, flight instruction, etc.

As can be seen, wing 388 comprises a streamlined design that induces a large and volatile or turbulent vortex 404 as fluid 2 leaves the surface of wing 388. These large and volatile vortices are a direct result of the imbalanced fluid flow and pressure differentials across the upper and lower surfaces of wing 388, and particularly, to the greater pressure drag existing at the frontal surface than that at the rear or tail (see FIGS. 10-A and 10-B and the description pertaining to these). Due to these differentials and imbalances, as the air leaves the end of wing 388 it does so violently, thus creating large vortex 404.

On the other hand, wing 392 comprises a plurality of fluid flow regulators 10 that, among other things, create a greater equilibrium in pressure drag between the frontal surface and the tail end of wing 392, as well as to regulate pressure along the upper and lower surfaces of wing 392 (again, see FIG. 10-A and 10-B and the description pertaining to these). All of this drastically reduces the separation of the fluid from the blades, resulting in more laminar, optimized flow. The regulation of pressure, the greater equilibrium created in the fluid flow, and the generally optimal fluid flow generated by fluid flow regulators 10 substantially reduces the wing tip vortex potential of wing 392. As shown, the vortex 408 generated from air 2 leaving the surface of wing 392 is much smaller and much less volatile as the transition from wing to air is made significantly smoother and much less violent by the fluid flow regulators.

FIG. 12 also illustrates that a wing or wing structure may comprise a plurality of fluid flow regulators 10 arranged in any given configuration or orientation. Those shown on wing 392 are not intended to be accurate, but merely represent the contemplation of several orientations with respect to the direction of fluid flow 2. The specific orientation, number, and design of fluid flow regulators 10 for any given wing will most likely be a strategic determination that requires significant research, study, experimentation, and analysis.

In addition, FIG. 12 illustrates stabilizer wing structures 396 and 400. As can be seen, each of these may also comprise one or more fluid flow regulators to achieve optimal fluid flow across their surfaces.

It should be noted that the present invention is applicable to wings of any shape, size, and/or geometry and to wings found on any type of aircraft using wings for flight assistance. In addition, the present invention contemplates that the fluid flow regulators may be utilized on and advantageously effect fluid flow on various other wing structures, such as rudders, stabilizers, etc.

The following examples represent some of the applications and structures to which the present invention fluid control system and method, and particularly the fluid flow regulators, can be applied to and/or formed within. These examples are not intended to limit the present invention in any way as one ordinarily skilled in the art will recognize perhaps several other obvious applications and structures to which the present invention may apply.

EXAMPLE ONE

The following experiment was carried out by obtaining two toy air planes having wingspans of about four feet. In this example, the wings of one airplane were modified to comprise one or more fluid flow regulators therein. During several test flights in which the modified airplane was tested against a non-modified airplane, the airplane having one or more fluid flow regulators incorporated into its wings performed significantly better than the non-modified airplane comprising a prior art streamlined wing. The airplane having the plurality of fluid flow regulators flew farther and faster than the non-modified airplane. Conditions were controlled as much as possible, with test flights being randomly selected to provide for and account for as much environmental change as possible. In each test, the modified airplane out performed the non-modified airplane.

Specifically, two identical COX model P-51 electric powered model airplanes were purchased from a local store. Each of them was assembled in the exact same way and according to the same specifications. However, on one of the airplanes, a plurality of ledges were cut into the Styrofoam wings. These ledges were the fluid flow regulators discussed above. Because the testing was initial, no substantial calculations were made nor was any analysis conducted to determine the most appropriate number, placement, and orientation of the fluid flow regulators. They were randomly formed into each of the wings, as well as in the stabilizers.

The airplanes were then taken to an open field for test flights. The batteries were charged in equal amounts to provide as much uniformity between the planes as possible. The first airplane tested was the one having the unmodified wings, or the standard model. The power was switched on and the airplane launched. The airplane flew only for a short time and its total flight distance was measured at about fifty feet.

Following this test the airplane having the plurality of fluid flow regulators was tested. The plane was powered on the launched. Remarkably, the plane climbed to an altitude of about 100 feet and flew a substantial distance. When the plane finally landed, its total flight distance was measured at about 500 feet.

As can be seen, the plane utilizing the plurality of fluid flow regulators outperformed the standard model in every respect.

EXAMPLE TWO

The following experiment is similar to the one described in Example One in that two identical model airplanes were tested, only these airplanes were smaller is size. In this example, the wings of one airplane were modified to comprise one or more fluid flow regulators therein. During several test flights in which the modified airplane was tested against a non-modified airplane, the airplane having one or more fluid flow regulators incorporated into its wings performed significantly better than the non-modified airplane comprising a prior art streamlined wing. The airplane having the plurality of fluid flow regulators flew farther and faster than the non-modified airplane. Conditions were controlled as much as possible, with test flights being randomly selected to provide for and account for as much environmental change as possible. In each test, the modified airplane out performed the non-modified airplane.

Specifically, the airplanes purchased comprised smaller, higher wings than those on the P-51's of Example One. Each of them was assembled in the exact same way and according to the same specifications. However, on one of the airplanes, a plurality of ledges were cut into the Styrofoam wings. These ledges comprise the fluid flow regulators discussed above. Because the testing was initial, no substantial calculations were made nor was any analysis conducted to determine the most appropriate number, placement, and orientation of the fluid flow regulators. They were randomly formed into each of the wings, as well as in the stabilizers.

The airplanes were then taken to an open field for test flights. Again, the first test was to with standard model plane. Several test flights were made, with the longest flight distance being about 50 feet. Subsequently, the modified airplane was tested, making several test flights as well. During each test, the modified airplane climbed to an altitude of over 100 feet and flew an average of at least 700 feet.

These early experiments indicate that those planes utilizing one or more fluid flow regulators on their wings and wing structures are much more efficient than airplanes having streamlined wings.

The present invention further features a method for improving or optimizing the air flow over a wing and for optimizing the performance of a wing subject to air flow. The method comprises the steps of obtaining a wing or wing structure having at least one surface subject to fluid or air flow; featuring at least one fluid flow regulator with the surface; and subjecting the wing to air flow. The fluid flow regulator comprises all of the elements described herein, and functions as described herein. All of the features, functions, elements, and advantages discussed above and herein are hereby incorporated into the foregoing method.

FLUID DIFFUSERS COMPRISING A FLUID FLOW REGULARING SYSTEM AND METHOD

In another exemplary, and preferred embodiment, the present invention is particularly applicable to diffusers of any size, shape, arrangement, and/or geometry. In general, diffusers function to redirect or deflect fluid flow, turn potential energy of the fluid into useful kinetic energy, reduce the velocity and increase the static pressure of a fluid passing through a system, and others. Typically, flow is generated and caused to encounter a diffuser, and particularly the blades of a diffuser, by one or more rotary devices, such as a fan, a turbine, an impeller, or any other similar device.

Although primarily stationary in most operating environments, the blades of diffusers behave or perform much like the airfoil or wing structure described above, or rather the fluid flow over the blades of a diffuser behaves in a similar manner as the air flow over the wing or wing structure discussed above. However, there is at least one notable difference regarding airflow between diffusers and airfoils or wings. This difference is that the overall airflow about a diffuser is flowing in a substantially more circular pattern than the relatively linear airflow over a wing. However, and the reason that these two structures are similar, each blade of a diffuser functions like a wing in that the air flow encountered by each blade of a diffuser experiences substantially linear fluid flow from its leading to trailing edge.

With reference to FIGS. 13-A and 13-B, shown is a diffuser 440 comprising a plurality of blades or vanes 444 coupled to a central hub or spindle 448. Each of vanes 444 further feature at least one fluid flow regulator 410 incorporated into their surfaces.

Specifically, FIG. 13-B illustrate a single vane 444 taken in cross-section from diffuser 440. Vane 440 is situated about a rotary device (not shown) that also comprises a plurality of blades. FIG. 13-B illustrates one such blade of the rotary device, blade 452 as it is designed to rotate about vane 444 of diffuser 440. Vane 444 further comprises a plurality of fluid flow regulators 410-*a* and 410-*b* preferably positioned at or near an optimal pressure recovery point 430-*a* and 430-*b*, wherein fluid flow regulator 410-*a* is featured on an upper surface of vane 444, and fluid flow regulator 410-*b* is featured on a lower surface of vane 444. Each of fluid flow regulators 410-*a* and 410-*b* comprise pressure recovery drops 426-*a* and 426-*b*, respectively, as well as sub-atmospheric barriers 438-*a* and 438-*b*, re drops 426-*a* and 426-*b*. Fluid flow regulators 410-*a* and 410-*b*, and particularly pressure recovery drops 426-*a* and 426-*b*, respectively, allow the pressure gradients and fluid flow over the upper and lower surfaces of vane 444 to be optimized. As fluid flows over each of the upper and lower surfaces, it encounters fluid flow regulators 410-*a* and 410-*b*, wherein a sudden decrease in pressure is induced and sub-atmospheric barriers 438-*a* and 438-*b* are created. As such, these fluid flow regulators 410 reduce the drag along the upper and lower surfaces, wherein the potential for pressure recovery is increased. As pressure recovery is increased, friction drag is also decreased, which significantly reduces the separation and separation potential of water 2 and makes flow of fluid 2 much more optimal.

FIG. 13-C illustrates another exemplary embodiment of a diffuser. Specifically, diffuser 440 also comprises a plurality of vanes 444. Each vane 444 comprises or features a fluid flow regulator 410 in its surface. Diffuser 440 is stationary and functions to deflect fluid flow generated by impeller 480, also comprising a plurality of vanes 484.

The present invention further features a method for improving or optimizing the air flow over diffuser vane subject to fluid flow and for optimizing the performance of a diffuser. The method comprises the steps of obtaining a diffuser comprising at least one vane having at least one surface subject to fluid or air flow; featuring at least one fluid flow regulator with the surface; and subjecting the diffuser vane to air flow. The fluid flow regulator comprises all of the elements described herein, and functions as described herein. All of the features, functions, elements, and advantages discussed above and herein are hereby incorporated into the foregoing method.

The present invention may be embodied in other specific forms without departing from its spirit or essential characteristics. In addition, the described embodiments are to be considered in all respects only as illustrative and not restrictive. As such, the scope of the invention is indicated by the appended claims, rather than by the foregoing description. All changes which come within the meaning and range of equivalency of the claims are to be embraced within their scope.

What is claimed and desired to be secured by Letters Patent is:

1. An external fluid flow regulator incorporated into the surface of an object for regulating pressure gradients and influencing fluid flow across said surface, said regulator comprising:
   a removeably attached fluid flow regulator comprising:
   a leading edge comprising a surface capable of receiving a fluid thereon;
   an pressure recovery drop orthogonally disposed relative to the leading edge that extends a pre-determined distance away from said leading edge and said fluid and its flow, wherein said pressure recovery drop comprises at least one drop face therein, said at least one drop face having a pre-determined height, wherein the height of a drop face varies along the length of a given drop face, and wherein the drop face further comprises a length of a blended segment which transitions between the variable heights along the length of a given drop face said pressure recovery drop functions to regulate existing pressure gradients along said surface to optimize and equalize said fluid flow, wherein said regulation of said pressure gradients positively influences the flow properties and behavior of said fluid across said surface of said object, and the performance of said object subject to said fluid flow;
   a sub-atmospheric barrier that is suddenly generated as said fluid encounters and flows over said pressure recovery drop, said sub-atmospheric barrier comprising a low pressure area of fluid molecules having decreased kinetic energy that serve as a cushion between said higher kinetic energy fluid molecules in said fluid and the molecules at said surface to facilitate laminar flow and assist in the reduction of the separation potential of said fluid; and
   a trailing edge orthogonally disposed relative to the recovery drop that defines and extends from the base of said pressure recovery drop that provides a trailing flow boundary for said fluid.

2. The external fluid flow regulator of claim 1, wherein said pressure recovery drop is oriented in a position selected from the group consisting of perpendicular to the direction of flow of said fluid, substantially perpendicular to the direction of flow of said fluid, on an angle with respect to said direction of flow of said fluid, parallel or substantially parallel to the direction of flow of said fluid, and any combination of these.

3. The external fluid flow regulator of claim 1, wherein said pressure recovery drop comprises a formation selected from the group consisting of linear, curved, spline, and any combination of these.

4. The external fluid flow regulator of claim 1, wherein said fluid flow regulator comprises a pressure gradient regulator.

5. The external fluid flow regulator of claim 1, wherein said pressure recovery drop extends entirely across said surface.

6. The external fluid flow regulator of claim 1, wherein said pressure recovery drop extends across only a portion of said surface.

7. The external fluid flow regulator of claim 1, wherein said surface comprises a plurality of fluid flow regulators that function together to regulate, influence, and control fluid flow and its properties and characteristics across said surface.

8. The external fluid flow regulator of claim 1, wherein said fluid flow regulator is a dynamic fluid flow regulator capable of adjusting, to varying flow characteristics, environmental conditions, and operational situations.

9. The external fluid flow regulator of claim 8, wherein said dynamic fluid flow regulator comprises at least one selectively adjustable component, wherein said adjustable components are selected from a movable leading edge, a movable pressure recovery drop, and a movable trailing edge, each capable of adjusting the height of said drop face and said pressure drop.

10. The external fluid flow regulator of claim 1, wherein said fluid flow regulator comprises means for positioning said fluid flow regulator in any direction along the surface to align said fluid flow regulator with the optimal pressure recovery point.

11. The external fluid flow regulator of claim 1, wherein said fluid flow regulator comprises at least one component that oscillates with varying situations and conditions to vary the height of said pressure recovery drop.

12. The external fluid flow regulator of claim 1, wherein said leading edge is integrally formed with said surface.

13. The external fluid flow regulator of claim 1, wherein said pressure recovery drop is integrally formed with said surface.

14. The external fluid flow regulator of claim 1, wherein said trailing edge is integrally formed with said surface.

15. The external fluid flow regulator of claim 1, wherein said pressure recovery drop comprises a plurality of drop faces to magnify the influence of fluid flow regulator on said fluid.

16. The external fluid flow regulator of claim 15, wherein said plurality of drop faces each comprise a sub-atmospheric barrier.

17. The external fluid flow regulator of claim 1, wherein said pressure recovery drop is positioned at or proximate an optimal pressure recovery point.

18. The external fluid flow regulator of claim 1, wherein said fluid is selected from the group consisting of gaseous fluids, liquid fluids, and any combination of these.

19. An object surface having improved fluid flow thereon, said object surface comprising:
   at least one removeably attached fluid flow regulator comprising a pressure recovery drop having at least one drop face formed therein, wherein the height of a drop face varies along the length of a given drop face, and wherein the drop face further comprises a length of a blended segment which transitions between the variable heights along the length of a given drop face said fluid flow regulator functioning to optimize fluid flow over said surface of said object.

20. The object surface of claim 19, wherein said fluid flow regulator is positioned in an orientation selected from the group consisting of perpendicular to the direction of flow of said fluid, substantially perpendicular to the direction of flow of said fluid, on an angle with respect to said direction of flow of said fluid, parallel or substantially parallel to the direction of flow of said fluid, and any combination of these.

21. The object surface of claim 19, wherein said fluid flow regulator comprises a formation selected from the group consisting of linear, curved, spline, and any combination of these.

22. The object surface of claim 19, wherein said fluid flow regulator is positioned at or proximate an optimal pressure recovery point.

23. The object surface of claim 19, wherein said fluid flow regulator comprises a dynamic fluid flow regulator capable of varying the height of said at least one drop face.

24. The object surface of claim 19, wherein said fluid flow regulator comprises means for positioning said fluid flow regulator in any direction along the surface to align said fluid flow regulator with the optimal pressure recovery point.

25. The object surface of claim 19, wherein said fluid is selected from the group consisting of gaseous fluids, liquid fluids, and any combination of these.

26. The object surface of claim 19, wherein said pressure recovery drop is orthogonally related to said leading edge.

27. A fluid flow control system comprising:
   an object having at least one surface subjected to a fluid, such that said fluid flows about said object;
   a removeably attached fluid flow regulator featured and operable with said surface, said fluid flow regulator comprising:
      a leading edge;
      a pressure recovery drop, orthogonally related to said leading edge that extends a pre-determined distance away from said leading edge and has at least one drop face formed therein, said pressure recovery drop functions to regulate existing pressure gradients along said surface to optimize and equalize said fluid flow wherein the height of a drop face varies along the length of a given drop face, and wherein the drop face further comprises a length of a blended segment which transitions between the variable heights along the length of a given drop face;
      a sub-atmospheric barrier that is suddenly generated as said fluid encounters and flows over said pressure recovery drop, said sub-atmospheric barrier comprising a low pressure area of fluid molecules having decreased kinetic energy that serve as a cushion between said higher kinetic energy fluid molecules in said fluid and the molecules at said surface; and
      a trailing edge orthogonally disposed relative to the recovery drop that defines and extends from the base of said pressure recovery drop, said fluid flow regulator functioning to optimize fluid flow over said surface of said object.

28. A method for influencing external fluid flow over the surface of an object by regulating pressure gradients, and for reducing fluid separation about said surface, said method comprising the steps of:
   featuring at least one removeably attached fluid flow regulator with one or more surfaces of an object having at least one surface thereon, said fluid flow regulator comprising:
      a pressure recovery drop having at least one drop face formed between a leading and trailing edge and having an identified and calculated distance, wherein said pressure recovery drop and leading edge are orthogonally related, wherein the height of a drop face varies along the length of a given drop face, and wherein the drop face further comprises a length of a blended segment which transitions between the variable heights along the length of a given drop face;
   subjecting said object to a fluid, such that said fluid is caused to move about said object; and
   causing said fluid to encounter said fluid flow regulator, such that said pressure recovery drop induces a sudden drop in pressure as said fluid flows over said fluid flow regulator, wherein a sub-atmospheric barrier is created at the base of said drop face, said fluid flow regulator functioning to optimize fluid flow about said object, thus increasing the performance of said object in said fluid.

29. The method of claim 28, wherein said step of featuring comprises the step of positioning said fluid flow regulator at an optimal pressure recovery point.

30. The method of claim 29, wherein said step of positioning said fluid flow regulator comprises positioning it in an orientation selected from the group consisting of perpendicular to the direction of flow of said fluid, substantially perpendicular to the direction of flow of said fluid, on an angle with respect to said direction of flow of said fluid, parallel or substantially parallel to the direction of flow of said fluid, and any combination of these.

31. The method of claim 29, further comprising the step of repositioning said fluid flow regulator as said optimal pressure recovery points change in response to varying conditions surrounding said fluid flow.

32. The method of claim 28, further comprising the step of varying said pressure recovery drop, and particularly said height of said drop face, both consistently and inconsistently, along the length of said pressure recovery drop in response to changing conditions.

33. The method of claim 28, wherein said step of causing said fluid to encounter said fluid flow regulator has the effect of optimizing fluid flow and the performance of said object within said fluid, said fluid flow regulator:
   regulating the pressure gradients that exist along said surface by reducing the pressure drag at various locations along said surface, as well as the pressure drag induced forward and aft of said object, via a pressure recovery drop, wherein said recovery drop is orthogonally related to a leading edge;
   increasing pressure recovery and pressure recovery potential as a result of regulating said pressure gradients and reducing said pressure drag;
   reducing friction drag along said surface as a result of increasing said pressure recovery; and
   decreasing fluid separation and fluid separation potential as a result of said reducing friction drag.

34. A method for controlling the flow of fluid across an object surface and reducing fluid separation, said method comprising the steps of:
   obtaining an object subject to fluid flow, said object having one or more fluid bearing surfaces over which a fluid may flow;
featuring one or more removeably attached fluid flow regulators in said fluid bearing surfaces, said fluid flow regulator characterized by a pressure recovery drop orthogonally related to a leading edge for regulating pressure gradients and optimizing fluid flow and the performance of said object in said fluid, wherein the height of a drop face varies along the length of a given drop face, and wherein the drop face further comprises a length of a blended segment which transitions between the variable heights along the length of a given drop face;

subjecting said object to said fluid; and causing said fluid to flow about said object so that said fluid encounters said one or more fluid flow regulators.

35. The method of claim 34, wherein said one or more fluid flow regulators comprise:
- a leading edge existing in a plane and comprising a surface area, said fluid initially flowing across at least a portion of said leading edge;
  - a trailing edge also comprising a surface area, said trailing edge existing in a plane offset in a substantially parallel relationship from said plane of said leading edge, said trailing edge extending outward from said leading edge in the direction of flow of said fluid; and
  - a pressure recovery drop relating orthogonally to said leading edge and to said trailing edge, said pressure recovery drop comprising a drop face of a determined height extending between said leading edge and said trailing edge in a substantially perpendicular manner, said fluid flowing over said leading edge then said pressure recovery drop, which induces a sudden pressure drop that generates a sub-atmospheric barrier at the base of said drop face.

36. The method of claim 35, wherein said leading edge is adjustable to allow said height of said drop face to be adjusted as needed, both consistently and inconsistently.

37. The method of claim 35, wherein said trailing edge is adjustable to allow said height of said drop face to be adjusted as needed, both consistently and inconsistently.

38. The method of claim 35, further comprising an adjusting plane that extends from a rotatable attachment point distal said drop face to said drop face of said pressure recovery drop, said adjusting plane allowing said height of said drop face to be adjusted on demand in response to changing conditions.

39. A wing structure comprising:
- a frontal surface;
- an upper surface relating with said frontal surface;
- a lower surface opposite said upper surface and relating with said frontal surface;
- a wing tip relating to said upper and lower surfaces; and
at least one removably attached fluid flow regulator featured and operable with said upper surface, said fluid flow regulator comprising a leading edge, a trailing edge, and a pressure recovery drop orthogonally related to said leading edge extending between said upper and lower surfaces to form a down step, said pressure recovery drop comprising at least one drop face of a calculated height formed therein, wherein the height of a drop face varies along the length of a given drop face, and wherein the drop face further comprises a length of a blended segment which transitions between the variable heights along the length of a given drop face, said fluid flow regulator functioning to optimize air flow over said surface of said wing during flight of an aircraft and during various angles of attack.

40. The wing structure of claim 39, wherein said fluid flow regulator is integrally formed with said surface.

41. The wing structure of claim 39, wherein said fluid flow regulator is removably attached to said surface.

42. The wing structure of claim 39, wherein said fluid flow regulator is positioned in an orientation selected from the group consisting of perpendicular to the direction of flow of said air, substantially perpendicular to the direction of flow of said air, on an angle with respect to said direction of flow of said air, parallel or substantially parallel to the direction of flow of said air, and any combination of these.

43. The wing structure of claim 39, wherein said fluid flow regulator comprises a formation selected from the group consisting of linear, curved, spline, and any combination of these.

44. The wing structure of claim 39, wherein said fluid flow regulator is positioned at or proximate an optimal pressure recovery point.

45. The wing structure of claim 39, wherein said fluid flow regulator comprises a dynamic fluid flow regulator capable of varying the height of said at least one drop face.

46. The wing structure of claim 39, wherein said fluid flow regulator comprises means for positioning said fluid flow regulator in any direction along the wing surface to align said fluid flow regulator with the optimal pressure recovery point.

47. The wing structure of claim 39, wherein said pressure recovery drop is orthogonally related to said leading edge.

48. The wing structure of claim 39, wherein said upper and lower surfaces comprise a plurality of said fluid flow regulators.

49. The wing structure of claim 39, wherein said wing structure comprises a stabilizer.

50. The wing structure of claim 39, wherein said wing structure comprises a rudder.

51. A method of improving fluid flow over a wing comprising the steps of:
- obtaining a wing, said wing comprising an upper and lower surface;
- featuring a removeably attached fluid flow regulator in at least one of said upper and lower surfaces, said fluid flow regulator comprising:
  - a pressure recovery drop, orthogonally related to said leading edge, having a drop face of an identified, pre-determined distance, wherein the height of a drop face varies along the length of a given drop face, and wherein the drop face further comprises a length of a blended segment which transitions between the variable heights along the length of a given drop face;
  - a sub-atmospheric barrier induced at the base of said drop face as a fluid passes over said fluid flow regulator;
- subjecting said wing to a fluid; and
- regulating the pressure across said surface to optimize fluid flow over said wing.

52. A diffuser vane of a diffuser comprising:
- a deflector surface that receives fluid flow thereon from one or more fluid flow generators;
- at least one removeably attached fluid flow regulator featured with said deflector surface, said fluid flow regulator comprising:
at least one fluid flow regulator featured and operable with said deflector surface, said fluid flow regulator comprising:
- a leading surface;
- a trailing surface;
- a pressure recovery drop, orthogonally related to said leading edge, extending a pre-determined distance between said leading and trailing surfaces to form a down step, said pressure recovery drop comprising at least one drop face of a calculated height formed therein, wherein the height of a drop face varies along the length of a given drop face, and wherein the drop face further comprises a length of a blended segment which transitions between the variable heights along the length of a given drop face said fluid flow regulator functioning to regulate existing pressure gradients along said diffuser vane to optimize and equalize said fluid flow and to reduce the separation potential of the fluid, wherein said regulation of said pressure gradients positively influences the flow properties and behavior of said fluid across said deflector vane, and the performance of said diffuser;

a sub-atmospheric barrier that is generated as said fluid encounters and flows over said pressure recovery drop, said sub-atmospheric barrier comprising a low pressure area of fluid molecules having decreased kinetic energy that serve as a cushion between said higher kinetic energy fluid molecules in said fluid and the molecules at said surface to facilitate laminar flow and assist in the reduction of the separation potential of said fluid; and a trailing edge that defines and extends from the base of said pressure recovery drop that provides a trailing flow boundary for said fluid.

53. The diffuser vane of claim 52, wherein said pressure recovery drop is positioned at or proximate an optimal pressure recovery point.

* * * * *